United States Patent Office 3,081,499
Patented Mar. 19, 1963

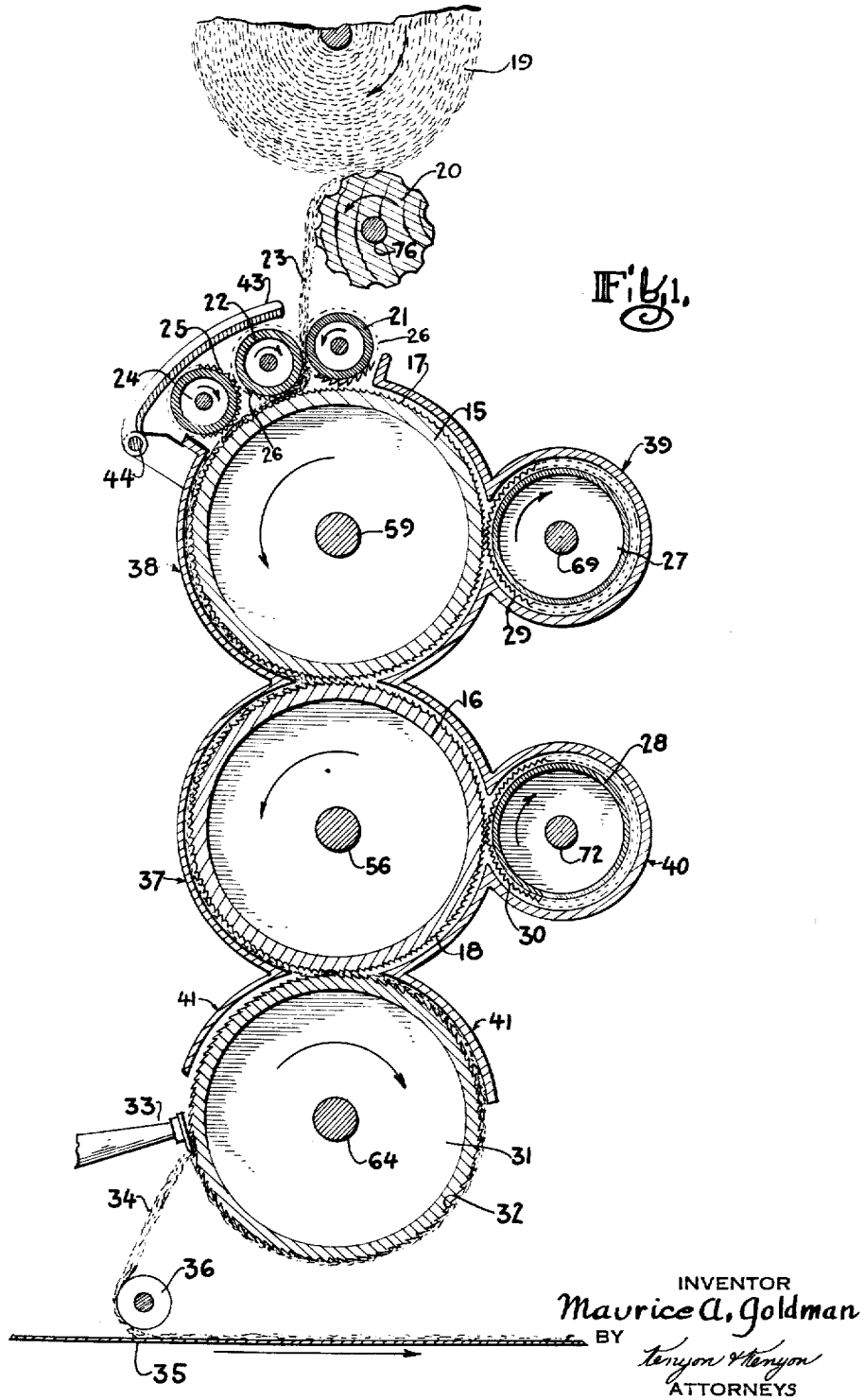

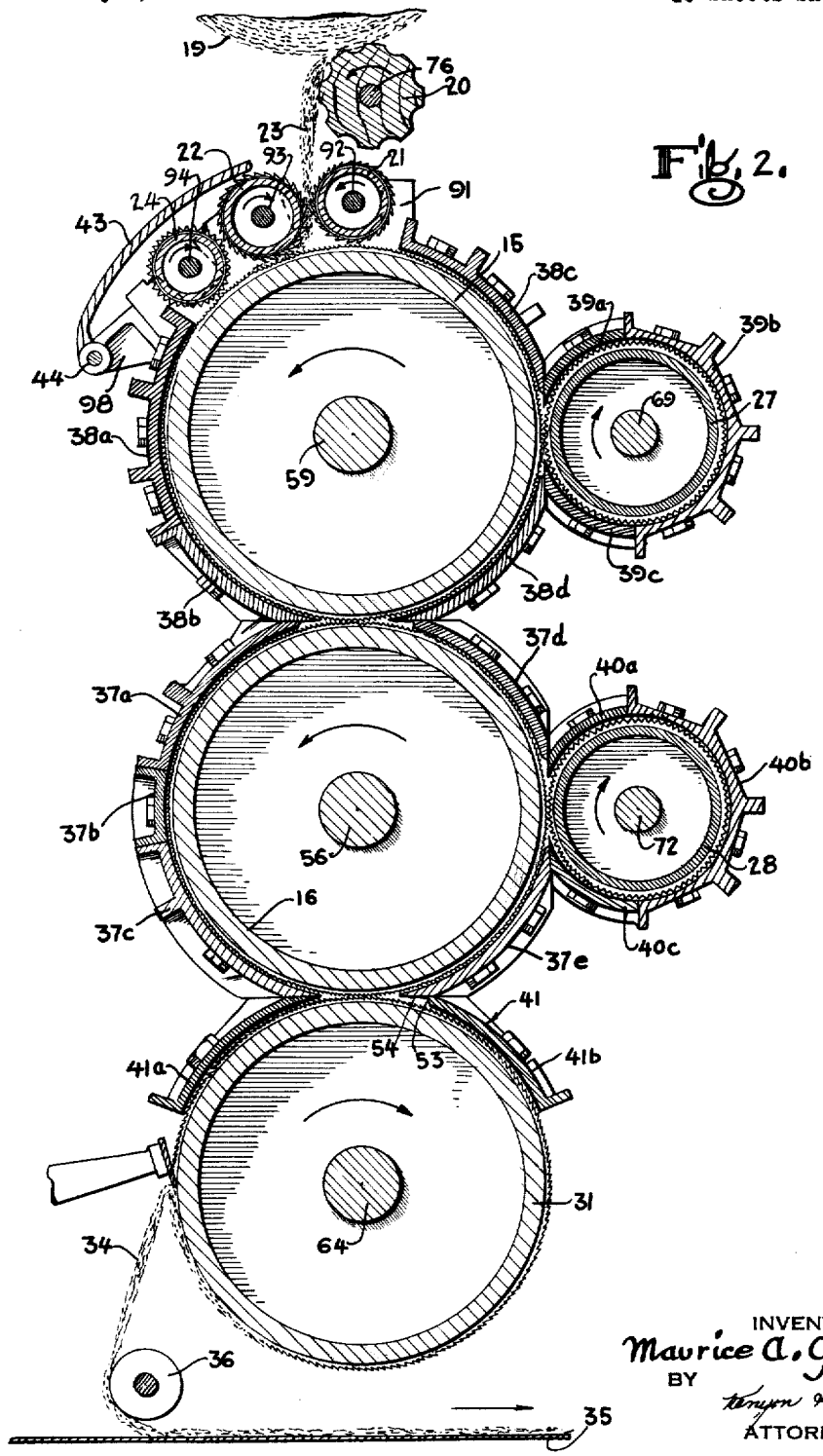

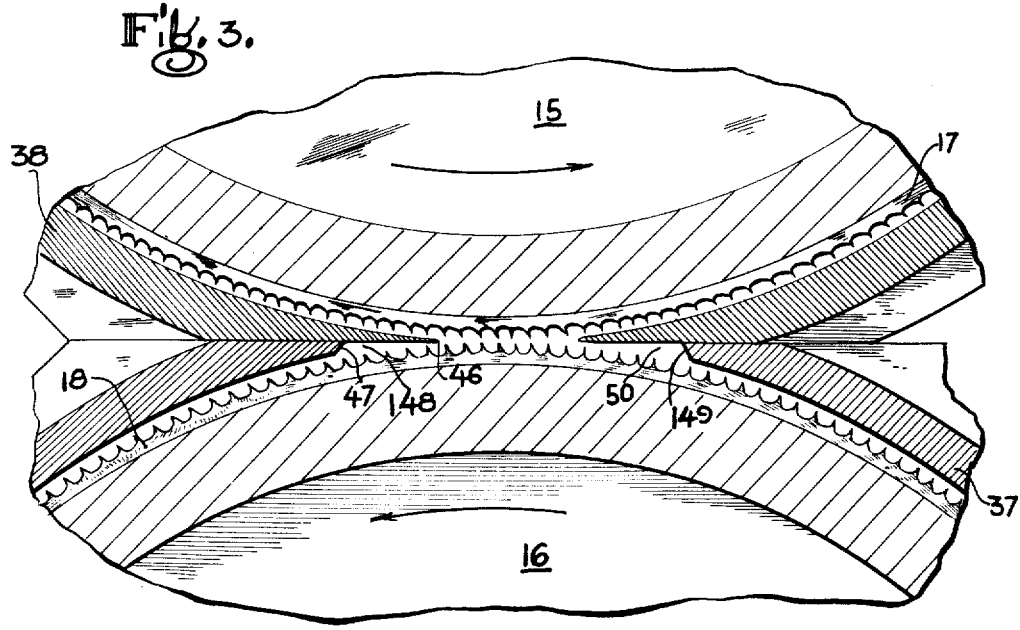
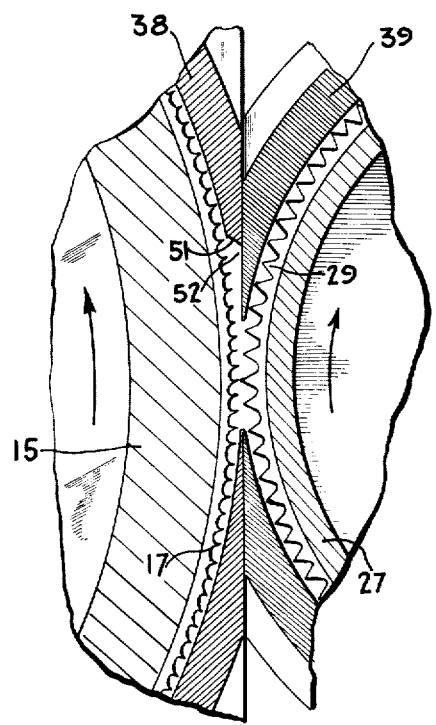

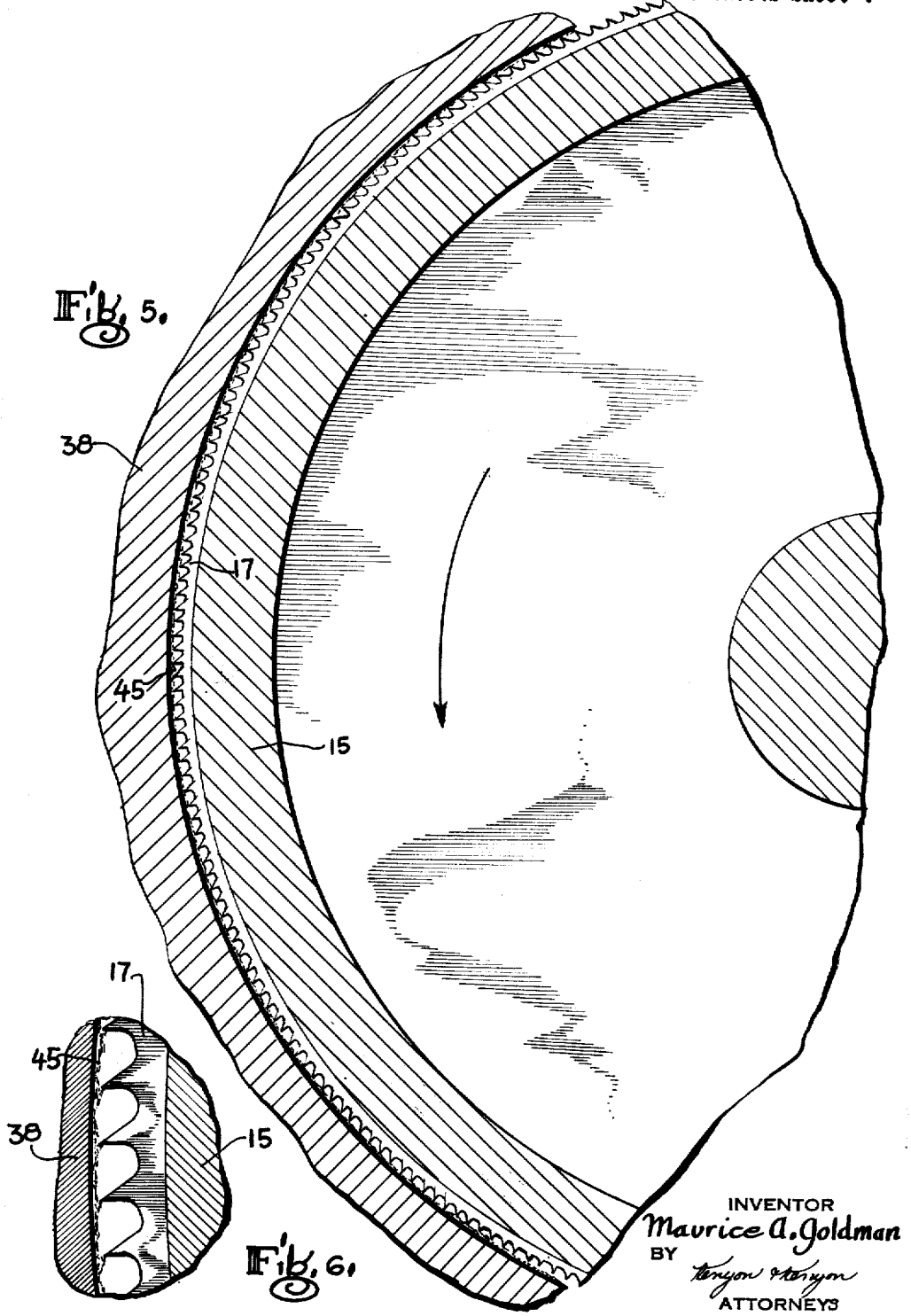

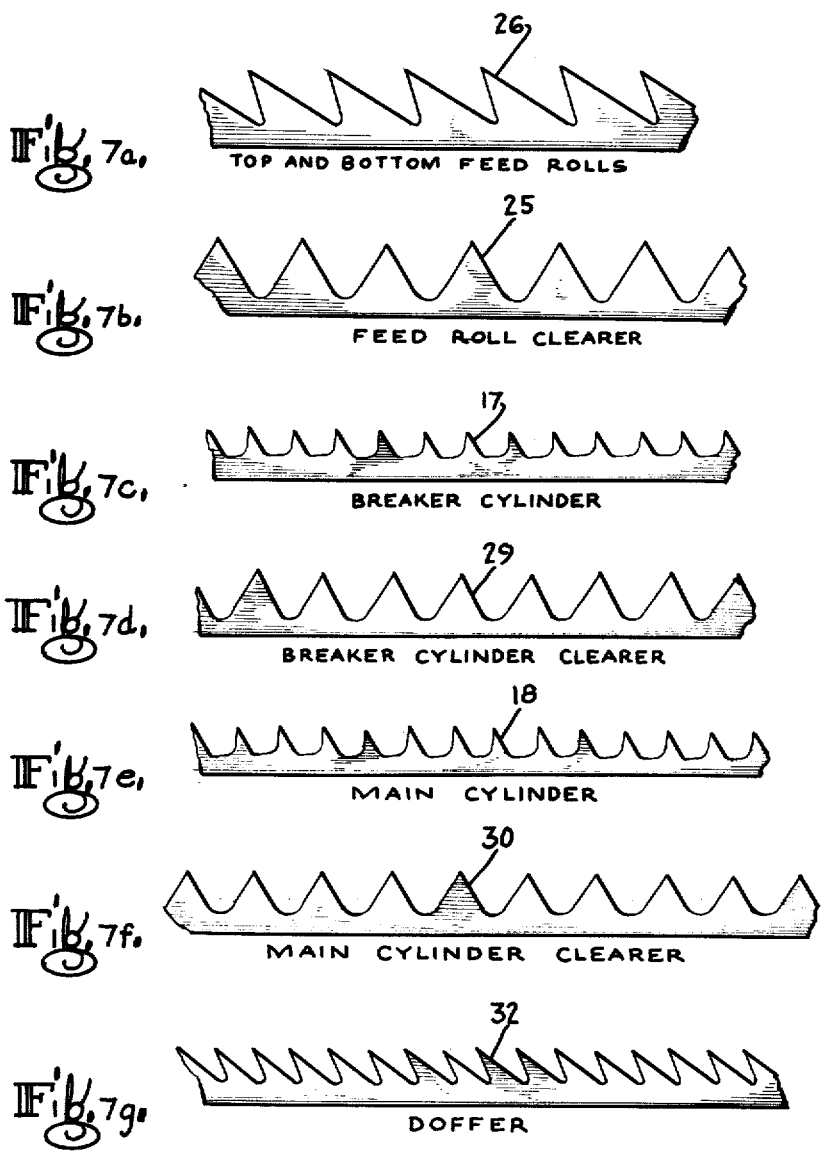

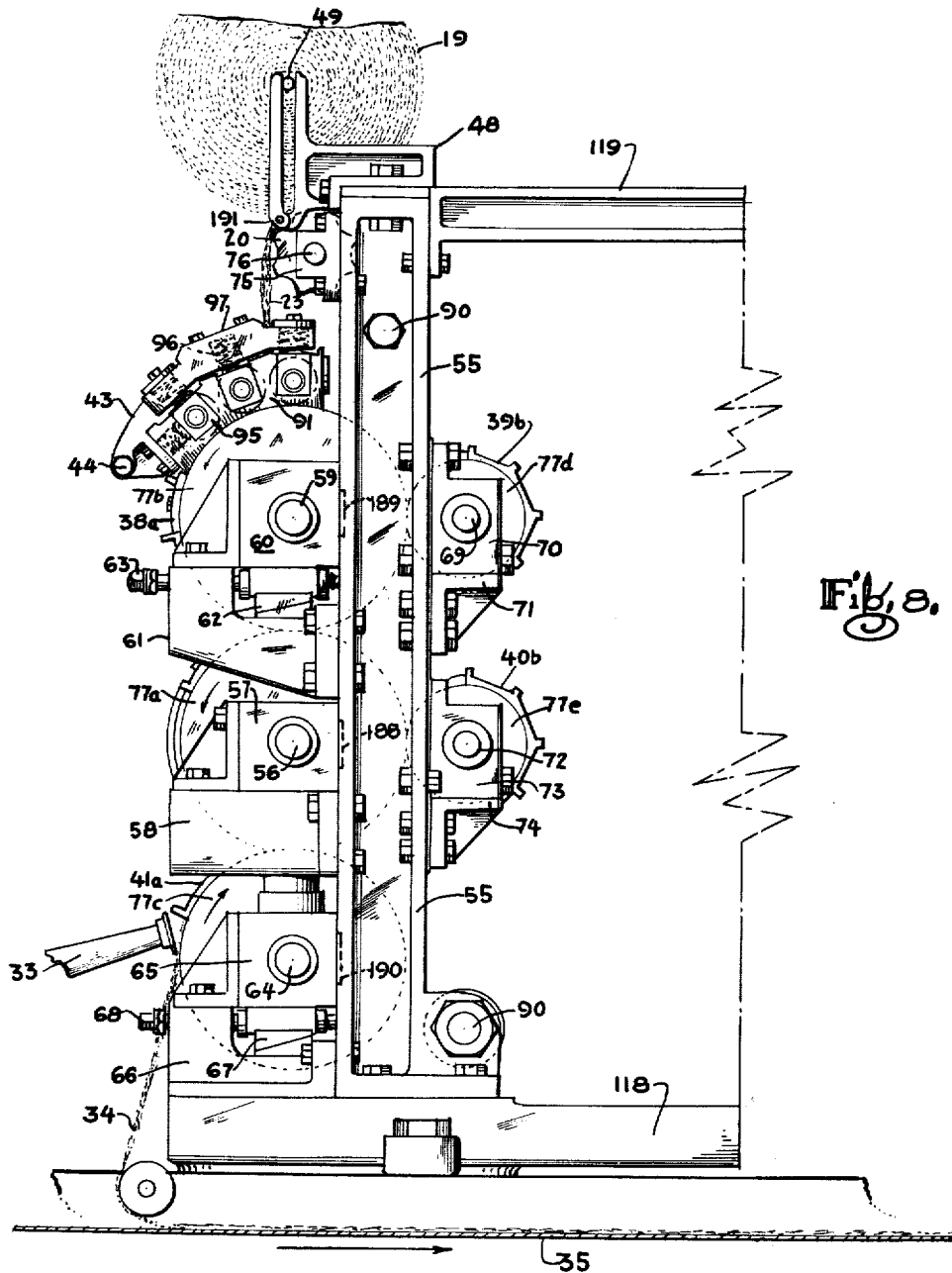

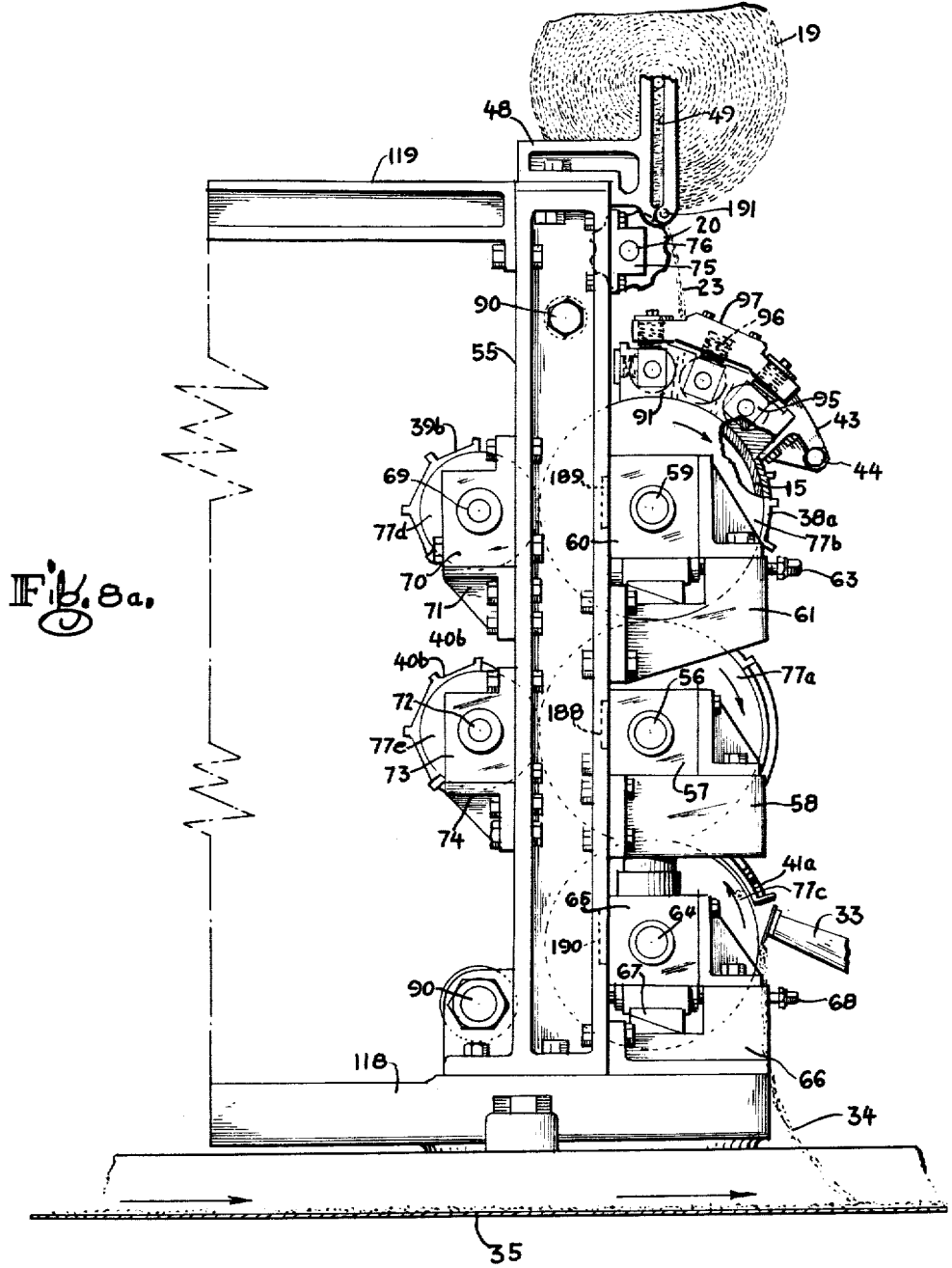

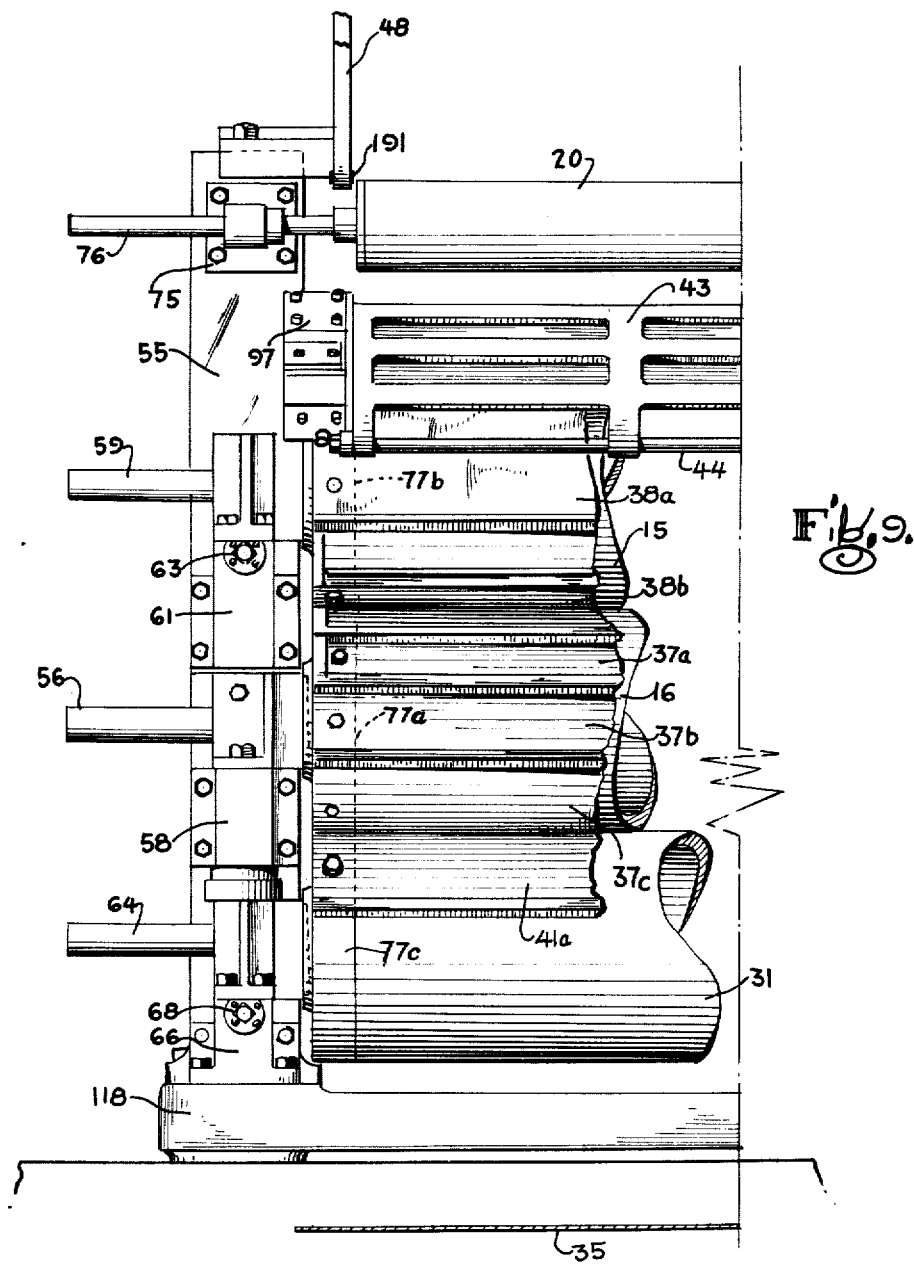

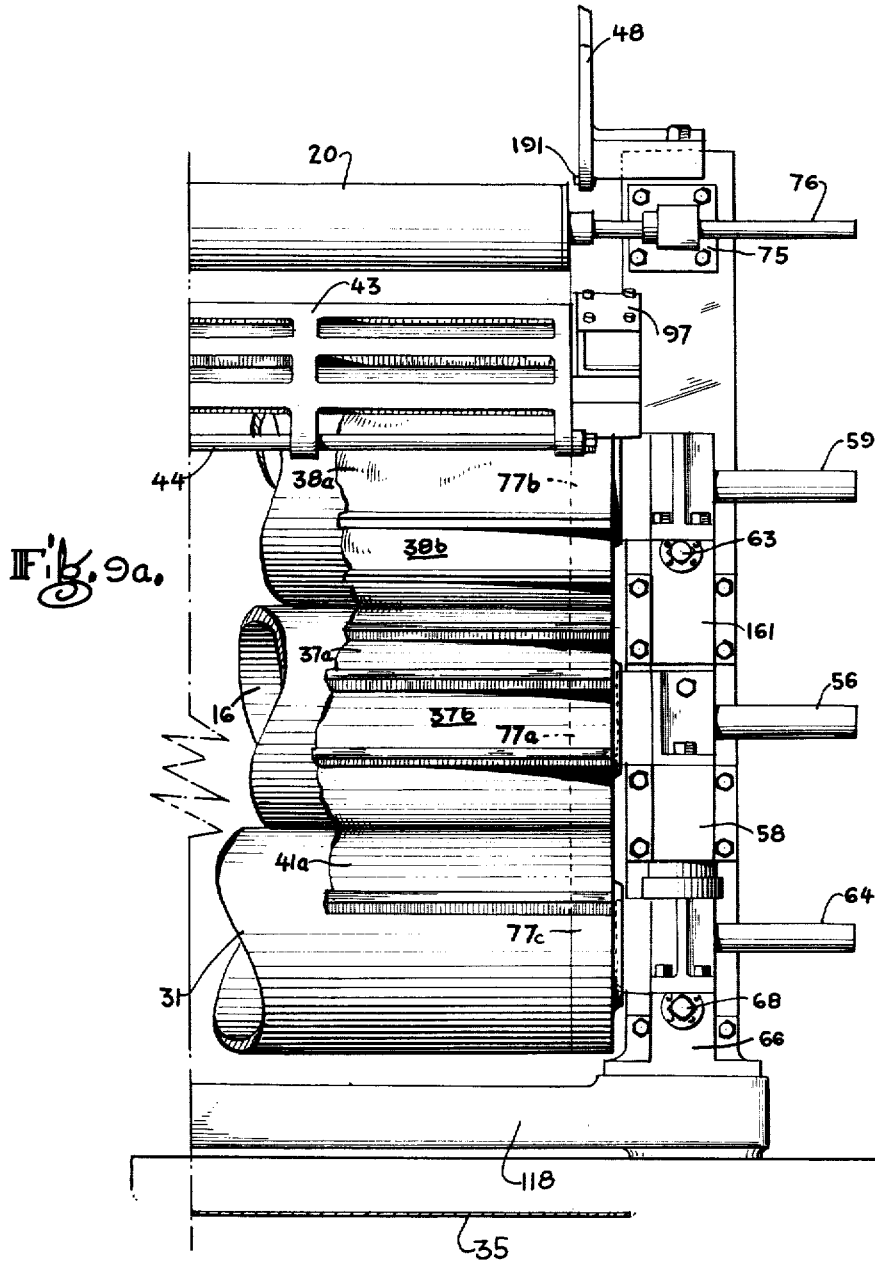

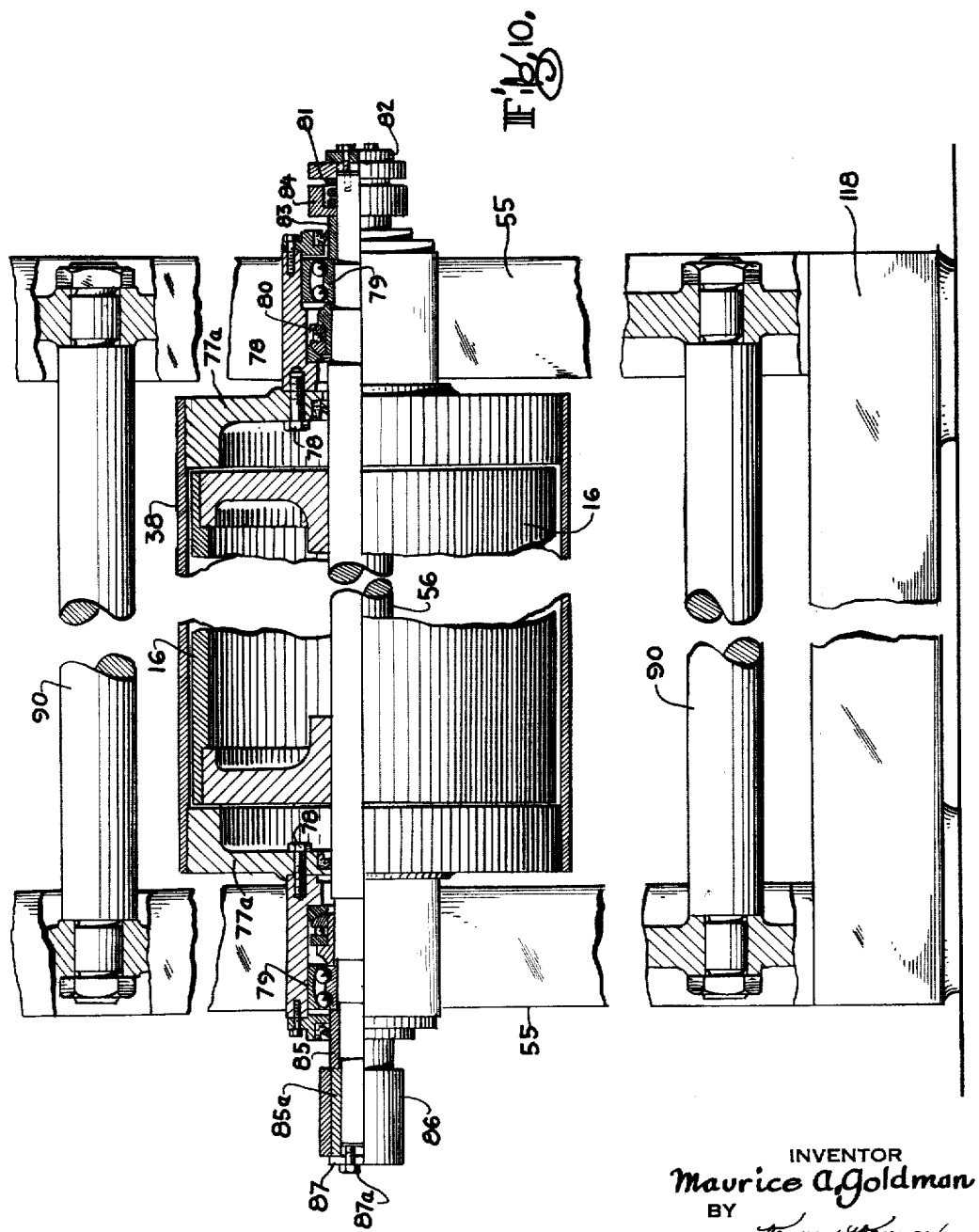

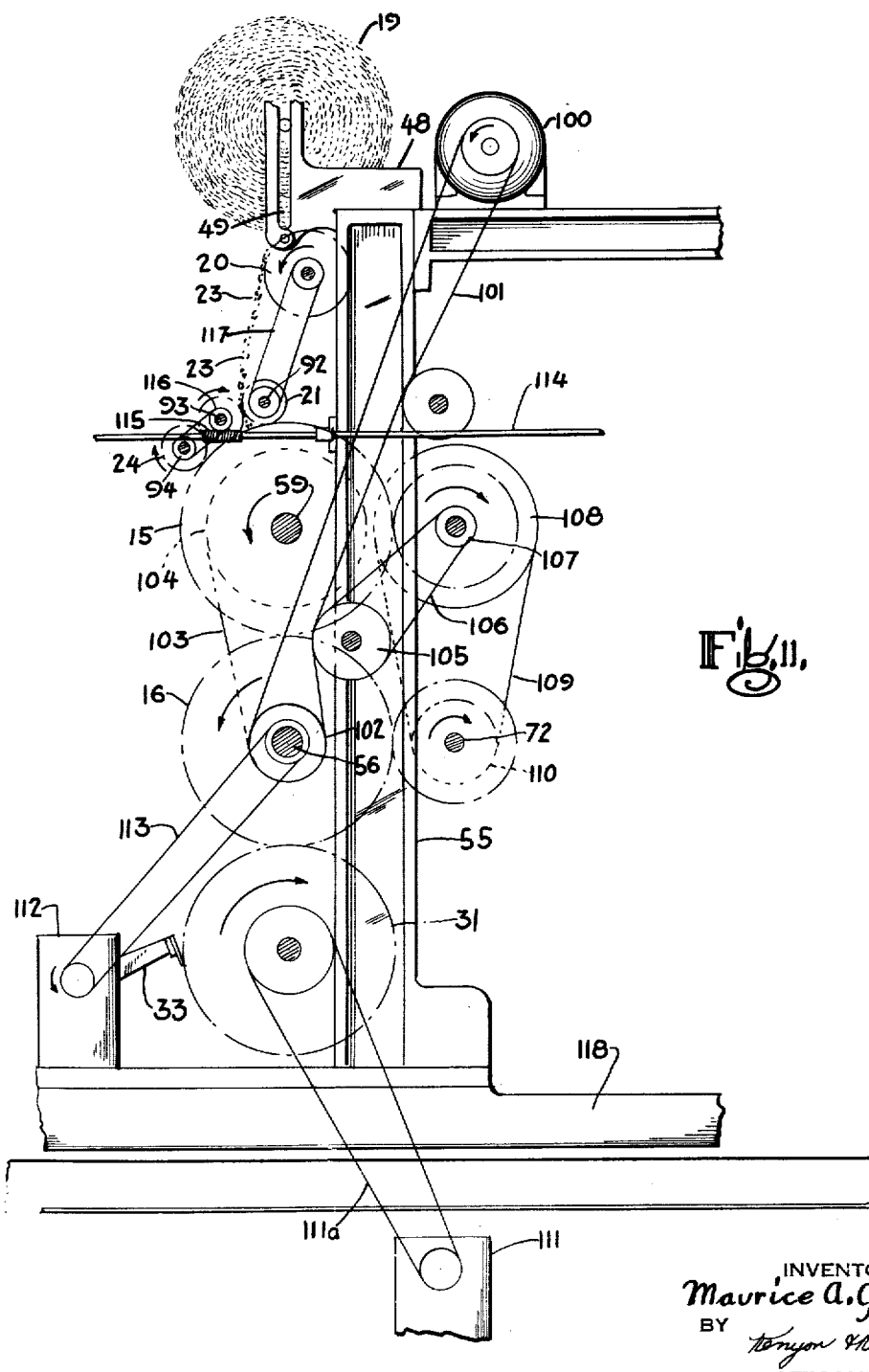

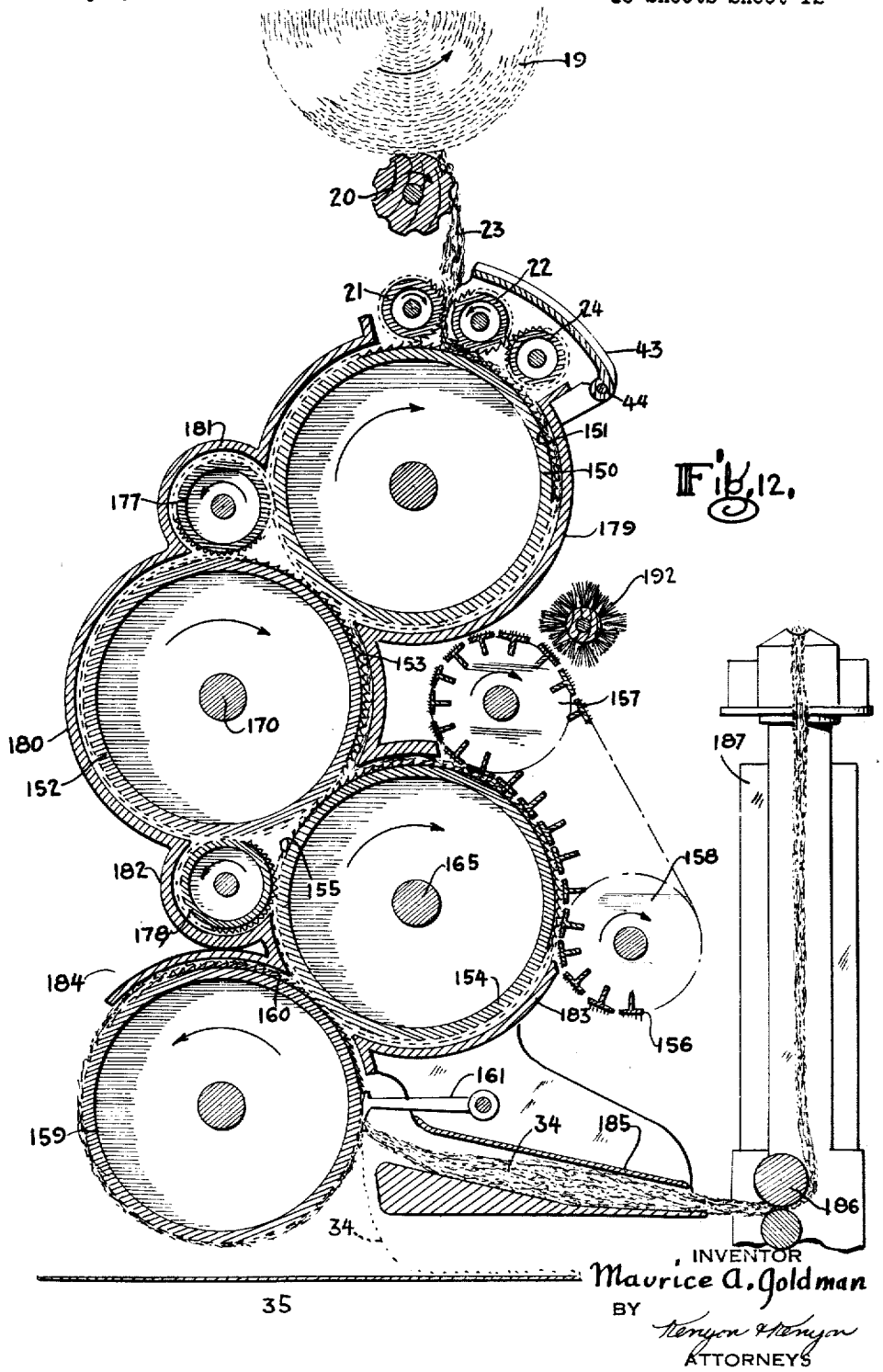

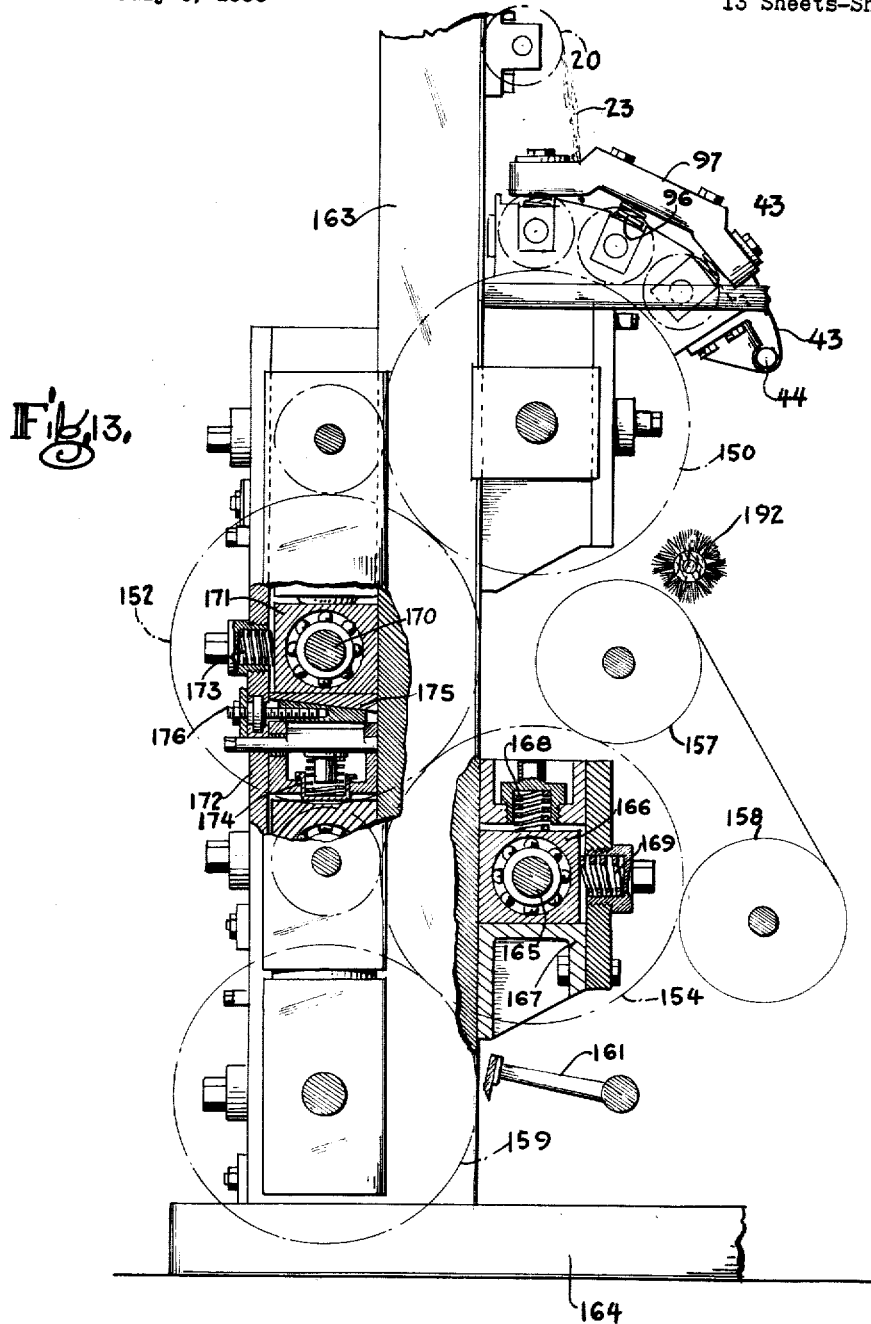

3,081,499
FIBER INTEGRATING APPARATUS
Maurice A. Goldman, Burlington, Mass., assignor, by mesne assignments, to Emil Shapiro, Providence, R.I.
Filed July 9, 1956, Ser. No. 596,681
26 Claims. (Cl. 19—99)

This invention relates to fiber integrating apparatus and relates more particularly to apparatus whereby fibers that are largely in a haphazard non-uniform condition, e.g. as initially formed into a batt or lap roll, may be subjected to controlled attenuation and integration into a web or sheet form. It is an object of this invention to provide improved fiber integrating apparatus for producing a web or sheet of carded unspun fibers.

While reference is made herein to carding and a carding machine, it is to be understood that these terms are used broadly as applicable to any operation or machine whereby the fibers are caused to assume a highly attenuated condition by the action of being picked off or combed by a multiplicity of teeth presented by relatively moving surfaces and whereby the highly attenuated fibers are subsequently condensed into a less attenuated condition constituting a web of fibers in sufficient amount and sufficiently integrated to permit the web, even though flimsy, to be taken off the machine.

Carding machines have long been used in connection with cotton fiber as for the purpose of effecting at least some cleaning of the fiber and of producing a web in which the fibers are to some extent oriented and which may, if desired, be consolidated into a sliver suitable for spinning. In a conventional carding machine for carding cotton fiber the main working cylinder typically has a relatively large diameter, namely, a diameter of about 50 inches. This cylinder usually has associated with it a much smaller licker-in cylinder and a doffer cylinder as well as flats, rolls, or the like which assist in orienting the fibers carried by the main cylinder. The main cylinder presents throughout its working surface a multiplicity of teeth whose forward surfaces, at least in the outer portion thereof, are inclined so that the teeth serve as hooks for snagging and carrying fibers therewith in substantially individual condition. Here and elsewhere in this specification and in the claims the forward surface of a tooth or pin is to be regarded as the surface of the tooth which faces in the direction of travel of the surface whereon the tooth is presented. The forward surfaces of the teeth of the main cylinder of a conventional carding machine normally present at least in the outer portion thereof, a very substantial rake angle such as a forward inclination of about 19° from lines constituting prolongations of radii from the axis of rotation of the cylinder. By virtue of the rake angle and a sharp extremity, the teeth on the main carding cylinder of a conventional carding machine are adapted to pick off fibers in a highly attenuated condition which drape around the individual teeth so as to occur to a substantial extent in a U or horseshoe configuration, and the fibers are held from flying off under the influence of centrifugal force by the rake angle of the forward surfaces of the teeth. The teeth are usually provided by clothing which may consist of a treated fabric base in which the teeth are set. Alternatively, clothing may be provided by producing a continuous metal wirelike strip presenting teeth on one side thereof which may be roughly compared with saw teeth except for their more forward inclination. The base of the wire is substantially wider than the teeth protruding therefrom and by winding the continuous wires on the surface of the cylinder a multiplicity of teeth may be caused to be presented by the surface of the cylinder which are substantially spaced from each other laterally by the extent to which the base of the wire is wider than the teeth.

In the conventional carding machine the licker-in cylinder is employed for the purpose of accomplishing a certain amount of cleaning and for preparing the fibers for reception on the pins presented by the rapidly moving surface of the main cylinder. The licker-in is surfaced with rake-type teeth which are substantially coarser than the teeth presented by the main cylinder. A heavy batt or lap of cotton fiber is slowly fed to the licker-in which serves to pick the fibers from the heavy batt or lap and carry them into operative relation with the surface of the main cylinder which is moving at about twice the peripheral speed of the licker-in and which picks off the fibers from the licker-in so as to become disposed on the main cylinder in a highly attenuated condition. In initially picking the fibers from the batt or lap introduced into the machine, the licker-in acts mechanically on foreign bodies that may be included among the fiber introduced into the machine so as to cause them to become separated from the fibers that are transferred to the main cylinder.

When better orientation of the fiber is desired than that which is provided by the carding action of the main cylinder by itself, there may be disposed in operative relation to the surface of the main cylinder a number of flats which present pins having a dragging action on the fibers carried by the teeth on the main cylinder that additionally orient and may perform an additional cleaning function. The flats may be mounted on a movable support so that while they are substantially stationary in comparison with the high rate of travel of the surface of the main cylinder, they become moved away successively from the surface of the main cylinder so that they may be acted upon by a clearing device. Instead of flats, rolls are frequently employed when less high standards in the finished product are all that are required.

After the carding on the main cylinder has been completed, the attenuated fibers carried thereby are caused to come in operative relation to teeth presented by a doffer cylinder having a considerably lower peripheral speed. In the case of the doffer cylinder, it is the rearward surfaces of the teeth which are raked at an acute angle so that the fibers carried by the main cylinder will become snagged on and carried by the teeth presented by the doffer cylinder. After the fibers have been transferred to the teeth of the doffer cylinder, the fibers which have become condensed to a much more substantial web on the doffer cylinder are removed from the doffer cylinder and the web of unspun, but substantially oriented fibers, may be taken away for such further processing as may be desired.

Conventional carding machines, as will be referred to more in detail hereinbelow, have inherent drawbacks in that they have definite limitations as regards pounds per hour throughput of fiber and as regards the shortness of fiber that may be carded. Conventional carding machines likewise at best require frequent shutdowns for cleaning and, moreover, they are bulky and require a lot of floor space relative to output. Other drawbacks relate to the character of the web produced including non-uniformity along the selvages and longitudinal striations.

It is a principal object of this invention to provide a carding machine which has a much greater capacity in terms of pounds carded per hour as compared with conventional carding machines.

A related object of this invention is to provide a carding machine wherein operational difficulties due to loading are minimized so as to virtually eliminate this troublesome problem.

A further object of this invention is to provide a carding machine capable of producing a more uniform web both as regards the distribution of the unspun fibers therein and the extent to which snarls, clumps and pills are eliminated. Moreover, it is also an object of certain embodiments of this invention to produce a web wherein there is more uniform distribution of the fibers so as to extend in all directions, as distinguished from being oriented primarily in one direction.

Another object of this invention is to provide a carding machine which is capable of successfully carding fibers which are shorter and correspondingly cheaper than the fibers which can be successfully handled on the conventional carding machine. Another object of this invention is to provide a carding machine which has less tendency to fiber breakage as compared with the conventional carding machine.

A further object of this invention is to provide a carding machine which occupies much less floor space as compared with conventional carding machines.

A further object of this invention is to provide improved means for producing a web of carded fibers suitable for the production of fabrics comprising bonded unspun fibers. A still further object of this invention is to provide an improved carding machine for producing fibers in sliver form for spinning, especially the synthetic fibers.

Certain features of this invention relate to the utilization of carding cylinders that have cover means associated therewith having arcuate interior surfaces in such close proximity to the extremities of teeth carried by the carding cylinders as to provide a passage wherein substantially all of the air therein is carried with the teeth so that the teeth propel the air and the fibers are carried by both the teeth and the air propelled by the teeth. Further features of this invention relate to the disposition of the cover means in immediate proximity to the nip between two carding cylinders on the side of the nip toward which the surface of the slower moving carding cylinder approaches so as to provide a carding edge about which the fibers are drawn in being transferred from one carding cylinder to another which is being rotated in the same direction and while the fibers are being carried in air streams propelled by the teeth in the narrow arcuate spaces underneath the cover means for the cylinders. Preferably the cylinders are as nearly completely surrounded by the cover means as possible so that each of a pair of carding cylinders will have a blanket of air moving therewith, this applying especially to the carding cylinder which is rotating at the greater speed.

Further features of this invention reside in the provision of the cover means with the interior surfaces thereof in juxtaposed spaced relation to the extremities of the teeth in combination with teeth whose forward surfaces are substantially in alignment with prolongations of radii from the axis of rotation of the cylinder which presents the teeth. For brevity of expression, teeth having such configuration on the forward faces thereof will be referred to hereinafter as radial teeth.

In carding machines as used heretofore radial teeth would not have been a possibility due to the fact that the cotton fibers would fly off of them because of centrifugal force. However, when cover means is employed having interior surfaces which are spaced from the teeth extremities by a very small clearance such as 0.015 inch, the teeth in effect act as small fan blades which carry therewith and control the air in the space underneath the cover means, and the air stream together with the pushing action provided by the teeth successfully carries fibers along throughout the extent of the cover means. However, when the cover means is discontinued so as to expose the teeth, as, for example, at the nip between two of the carding cylinders, the radial character of the teeth is such that the fiber carried thereby unloads from the teeth very readily and may be transferred to another cylinder. The radial teeth which are employed preferably have a substantial notch behind each tooth which is of substantial size so as to accommodate a large throughput of fiber. Moreover, by utilizing the apparatus of this invention the number of teeth per square inch may be greatly reduced and this likewise serves to augment the capacity of the machine for handling a large throughput of fiber.

Further features of this invention reside in the utilization of carding cylinders which are much smaller than the carding cylinder used in a conventional carding machine and in rotating the carding cylinders at a higher rate of speed, thereby providing greatly increased centrifugal force in relation to peripheral speed. In this way the apparatus takes advantage of the increased centrifugal force for unloading the teeth.

Further features of this invention reside in the manner of and means for mounting the carding cylinders, feed mechanisms, doffing mechanisms, and covers, and in the employment of end closures therefor.

Other features of this invention reside in the mounting of carding machines in complementary pairs having common framework whereby vibration is reduced and vertical mounting with economy and sturdiness of frame elements is afforded.

Further objects, features and advantages of this invention will becomes apparent from the following description of certain illustrative embodiments and ways of practicing this invention in connection with the accompanying drawings, wherein:

FIG. 1 is a diagrammatic representation in sectional end elevation of a preferred embodiment of a carding machine according to this invention;

FIG. 2 is a sectional end elevation of the carding machine shown in FIG. 1;

FIG. 3 is a detail view on an enlarged scale and in sectional elevation showing the region of the nip between the first and second carding cylinders;

FIG. 4 is a detail view on an enlarged scale and in sectional elevation showing the region at the nip between one of the carding cylinders and the clearing roll therefor;

FIG. 5 is a detail view on an enlarged scale illustrating the relationship between the clothing for one of the carding cylinders and the overlying cover means and the action in carrying fibers in an air stream propelled by the teeth combined in the clothing;

FIG. 6 is a fragmentary view of the parts shown in FIG. 5 partly in section and on a greatly enlarged scale;

FIGS. 7a, 7b, 7c, 7d, 7e, 7f, and 7g are fragmentary views in side elevation of the clothing for the different cylinders and rolls of the carding machine;

FIG. 8 is an end elevation of one carding machine according to FIGS. 1 to 6 combined in a complementary pair according to this invention, the drive mechanisms being omitted;

FIG. 8a is an end elevation similar to FIG. 8 but of the other carding machine combined in the pair;

FIGS. 9 and 9a are a front elevation of the left and right sides, respectively, of the carding machine shown in FIGS. 1 to 7, the drive mechanisms being omitted;

FIG. 10 is a front elevation partly in a section and on an enlarged scale showing the detail of the mounting means for one of the carding cylinders;

FIG. 11 is a schematic end elevation of the machine of FIG. 8 showing the drive mechanisms at one end;

FIG. 12 is a schematic view in end elevation of an alternative embodiment of a carding machine embodying my invention; and FIG. 13 is a partly schematic view in end elevation of the embodiment of FIG. 12 showing frame elements, certain of the parts being shown in sectional detail.

Reference will first be made to the embodiment of this invention shown in FIGS. 1 to 11, this embodiment being illustrative of a preferred form of carding machine for producing a carded web of fibers, e.g. cotton fibers.

In FIG. 1 the essential operational elements of a carding machine embodying this invention have been shown largely schematically. The carding action is effected by the successive action of the carding cylinders 15 and 16. These cylinders are mounted for rotation about parallel axes in the same direction and with the peripheral speed of the cylinder 16 substantially greater than the peripheral speed of the cylinder 15. Each of the cylinders 15 and 16 presents a multiplicity of radial teeth on the surface thereof. These teeth are preferably provided by clothing of the wound-on type hereinabove referred to. The clothing for the cylinder 15, which is the breaker cylinder, comprises the teeth 17 and is shown in enlarged detail in FIG. 7c. The cylinder 16 is the main carding cylinder and in FIG. 1 the teeth for the clothing therefor are indicated at 18. The clothing for the cylinder 16 having the teeth 18 is indicated in enlarged form in FIG. 7e.

By way of concrete illustration, the diameter of each of the rolls 15 and 16 including the clothing may be 12½ inches. On the clothing for each of the cylinders 15 and 16 the teeth are distributed therealong so that there are 8.83 teeth per inch. It is preferable, however, that the teeth be set laterally somewhat closer together on the cylinder 16. For example, on the cylinder 15 there may be 23 rows of teeth per inch, while for the main cylinder 16 there may be 28 rows of teeth per inch. On the main cylinder, therefore, there are substantially 250 teeth per square inch and on the breaker cylinder there are 200 teeth per square inch. This may be contrasted with conventional carding machines which usually utilize clothing such that there are about 500 teeth per square inch. The overall height of the clothing is 0.17 inch of which the height of teeth at the forward radial edge is substantially 0.10 inch. The teeth are tapered to a point in the usual way from the base of the clothing, the width of which base determines the number of rows per inch of teeth of the clothing.

The fiber to be fed into the carding machine is supplied from a lap roll 19 which rests on the fluted feed supply roll 20 that is driven so that its peripheral speed is substantially the same (usually about 5% slower) as the peripheral speed of each roll of the pair of driven feed rolls 21 and 22, the roll 22 being referred to herein as the bottom feed roll. The supply roll 20 causes the fiber lap 23 from the roll 19 to be fed down between the feed rolls 21 and 22 in such manner that its rate of feed will be synchronized with the peripheral speed of the feed rolls 21 and 22. The feed rolls 21 and 22 may each be 3 inches in diameter and provided with heavy teeth of the rake type which are inclined oppositely to the direction of rotation of these rolls. The teeth on these rolls are provided by clothing wherein there are 4 teeth per inch in each row and there are 5 rows per inch. The overall extent of the height of the teeth may be of the order of 0.20 inch so that by virtue of the counter-inclination of the teeth and their substantial size a firm grip may be maintained on the lap 23 of fiber that is fed therebetween.

A clearer roll 24 is preferably employed which coacts with the surface of the bottom feed roll 22 to clear the teeth on the roll 22. The clearer roll 24, which rotates at the same peripheral speed as the roll 22, may be 3 inches in diameter and the teeth 25 presented thereby may be of the same order of size and arrangement as the teeth 26 presented by the feed roll with which they intersect except that the teeth 25 have the triangular configuration shown in FIG. 7b.

The clearer rolls 27 and 28 are disposed in operatively coacting relation with the cylinders 15 and 16, respectively. These rolls may be 6 inches in diameter and may be provided with clothing having triangular teeth 29 and 30, respectively, as shown on an enlarged scale in FIGS. 7d and 7f, respectively. On the clearer roll 27 there may be about 5 teeth per inch in each row and the number of rows corresponds to the number of rows of teeth on the cylinder 15, namely, 23 rows per inch. The clothing for the roll 28 likewise is such that there are 5 teeth per inch in each row, but for this roll the number of rows per inch is the same as the number of rows per inch on the cylinder 16, namely, 28 rows per inch.

Disposed below the cylinder 16 there is rotatably mounted the doffing cylinder 31. This cylinder has the same diameter as the cylinders 15 and 16, namely, 12½ inches. For condensing the carded fibers thereon, the cylinder 31 is provided with clothing having the teeth 32, the rear faces of which are inclined as shown on an enlarged scale in FIG. 7g. The clothing is such that in each row there are 8.83 teeth per inch and the width of the clothing is such that there are 28 rows per inch and the height of the teeth is approximately .12 inch.

For separating the condensed carded fiber web 34 from the doffer cylinder 31 any suitable means may be used, such as the doffing comb 33 which is adapted to be oscillated at high velocity. The separated web 34 may be utilized in different ways depending on its end use, as, for example, condensation into sliver form for spinning or utilization in production of sheet products comprising unspun fibers. In FIG. 1 the web 34 is shown as being deposited on the endless conveyor 35 after having passed over the surface of the guide roll 36.

It is to be noted that the main carding cylinder 16 is completely encased by the imperforate cover means 37 whose arcuate inner surfaces are in contiguous spaced relation to the extremities of the teeth 18 except at the nip between the cylinders 15 and 16, at the nip between the cylinders 16 and 31, and the nip between the cylinder 16 and the clearer roll 28. For brevity of expression, the zone of the line along which two cylinders or rolls mounted on parallel axes come into closest proximity is referred to as the nip between the cylinders or rolls whether the cylinders or rolls come into actual contact or are merely in juxtaposed spaced relation with a clearance therebetween and whether or not or how material contacting the surface of one or both of them passes between the cylinders or rolls. As above mentioned, the clearance between the inner surfaces of the cover means 37 and the teeth 18 preferably is of the order of 0.015 inch.

Similar cover means 38 is provided for the breaker cylinder 15 except for the region of the feed mechanisms and the clearer roll 27. In this instance also the clearance is preferably of the order of 0.015 inch.

As shown in FIG. 1, the clearer rolls 27 and 28 are provided with cover means 39 and 40, respectively, whose clearance with respect to the teeth is substantially the same as that of the cover means for the cylinders 15 and 16.

Cover means 41 is also provided for the upper portion of the doffer cylinder 31 and its clearance with respect to the teeth 32 preferably is of the order of 0.015 inch.

While a detailed example of the operation of the carding mechanisms shown schematically in FIG. 1 will be described hereinbelow, the general nature of the operation may be referred to at this point. The lap 23 is slowly and steadily fed into the carding machine where it passes between and is gripped by the feed rolls 21 and 22 which control the rate of feed and exert a restraining action thereon. As the fibers from the lap 23 emerge from between the feed rolls 21 and 22 they come into operative relation with the rapidly moving teeth 17 presented by the cylinder 15. Due to the high rate of travel of the peripheral surface of the cylinder 15, the teeth 17 pick off fibers from the lap 23 in a very highly attenuated condition. These fibers are carried underneath the cover means 38 and travel with a current of air which is propelled together with the fibers by the teeth 17 notwithstanding the radial disposition of the forward surfaces of these teeth. While the centrifugal force is high, nevertheless because of the close proximity of the inner surfaces of the cover the air in the arcuate passage provided underneath the cover means is controlled by the teeth so as to move therewith and even though the fibers may be thrown off of the extremities of the teeth and may be of the order of 0.0005 to 0.00075 inch in diameter in the case of cotton fibers they are carried with the air stream propelled by the teeth and at essentially the same rate of speed as the peripheral speed of the cylinder 15. The disposition of the roll 22 with reference to the cylinder 15 is such as to insure the high degree of attenuation of the fibers in being initially picked off and gripped by the teeth 17. The clearer roll 24 keeps the teeth on the feed roll 22 clear and by reason of its direction of rotation and proximity to the teeth presented by the cylinder 15 it aids in directing the fibers so as to be fed underneath the cover means 38. During normal operation the hinged cover 43 is in the position shown. When threading in the lap 23, the cover 43 may be swung out of the way about the hinge pivot bar 44 on which it is pivotally mounted.

While this invention is not to be regarded as dependent upon the accuracy of any particular theory as to the nature of the action taking place, the action which is regarded as taking place during the travel of the attenuated fibers with the air stream propelled by the teeth 17 so as to move with the surface of the cylinder 15 underneath the cover 38 has been indicated largely diagrammatically in FIGS. 5 and 6. Due to the centrifugal force, the attenuated fibers 45 tend to be carried by the tips of the teeth 17 partly within the recesses between the teeth and partly as thrown outwardly so as to drag on the inner surface of the cover means 38. Such dragging of the fibers provides an auxiliary carding effect which tends to orient the fibers more uniformly while the fibers are in a free, essentially air-borne condition. This additional carding effect is beneficial and for this reason it is not necessary to polish the inner surfaces of the cover means. On the contrary, these inner surfaces may preferably have a slight roughness imparted thereto, as by sandblasting, so as to augment the carding action which occurs while the fibers are being dragged along underneath the cover means.

When the attenuated fibers carried by the cylinder 15 reach the nip between the cylinders 15 and 16 in the zone of transfer where the teeth presented by these cylinders are exposed in juxtaposed spaced relation, the attenuated fibers carried by the cylinder 15 are transferred to the cylinder 16 so as to be fed onto and carried by the teeth presented thereby. The preferred structure at the nip between the rolls 15 and 16 is shown in FIG. 3 on an enlarged scale. Since the cylinders are rotated in the same direction and since the cylinder 16 is rotated at greater peripheral speed, e.g. twice the peripheral speed of the cylinder 15, the attenuated fibers carried by the cylinder 15 are thrown from the teeth 17 together with an air stream so that when the fibers meet the faster moving air stream which is propelled by the teeth presented by the cylinder 16, their direction of travel is reversed with the result that the fibers not only are pulled out from one another but also simultaneously are dragged out around the marginal edge 46 of the cover means 38. In this manner a vigorous carding action is afforded which tends to break up any snarls, clumps or pills from the original lap roll that may become carried to the nip between the cylinders 15 and 16. To assist in the transfer, the marginal edge 47 of the cover means 37 is cut away so as to provide the pocket 148 which provides an air space for facilitating the change of direction of the fibers about the edge 46.

Preferably, at the opposite side of the nip between the cylinders 15 and 16 the marginal edge 149 of the cover means 37 is cut away to provide a pocket 50. The pocket 50 facilitates the complete clearance of the teeth 17 presented by the cylinder 15 so that as the teeth 17 presented by the cylinder 15 move beyond the nip between the cylinders 15 and 16 very little fiber is carried along therewith. To the extent that fibers may be carried along with the teeth 17, the clearer roll 27 may be employed which rotates at a very high speed so that largely by wind action any fibers carried by the teeth 17 will be loosened. To facilitate the desired action, the cover means 38 is cut away along the edge 51 so as to provide the pocket 52. In this way any possibility of loading the teeth so as to accumulate fibers as time goes on is prevented. In actual practice it has been found that the cylinder 15 is easily and effectively unloaded under operating conditions and, if desired, the clearer roll 27 may be omitted as not being essential to successful carding.

Since the doffing cylinder 31 is rotated at a lesser peripheral speed as compared with the peripheral speed of the cylinder 16, the highly attenuated fibers which are carried in the wind stream propelled by the teeth 18 presented by the cylinder 16 are condensed at the nip between the main cylinder 16 and the doffing cylinder 31 and they are received on and become carried by the teeth 32 presented by the doffing cylinder 31. The cover means 41 for the doffing cylinder 31 affords controlled air stream conditions at the nip between the cylinders 16 and 31 whereby the fibers become uniformly condensed into a web which is carried on the teeth 32 to the doffing member 33 where the web becomes separated from the cylinder 31 and may, for example, be deposited on the continuous conveyor 35. As shown in FIG. 2, the cover means 41 may be cut away at 53 to provide the pocket 54 which facilitates the cleanness with which the transfer to the doffing cylinder 31 may be made. While the transfer is virtually complete, one may optionally employ the clearer roll 28, whose operation, function and utility are essentially the same as those referred to hereinabove in connection with the clearer roll 27.

The structural details for rotatably mounting the different cylinders have been shown in greater detail in FIG. 2 and FIGS. 8 to 11. As is apparent from FIGS. 8 and 8a taken together, it is preferable to provide a complementary pair of carding machines as a unitary structure. Except for the complementary relationship, the operating elements of each carding machine or unit are essentially the same and for this reason the following description will be applicable to only one of the carding machines except where reference is made to the mounting of the machines as a complementary pair.

The operating parts of the carding machine are disposed vertically, and the spaced upstanding, sturdy frame members 55 mounted on the base 118 are utilized to support the opposite ends of the cylinders and the rolls which are mounted for rotation about parallel axes. The cylinder 16 is fixedly mounted on the shaft 56, whose ends are rotatably mounted in bearing members 57 which are carried in brackets 58 that are secured to the frame members 55 as by bolts, the bearing members being keyed to the frame members by the key and keyway indicated at 188 without permitted adjustability in any direction. The cylinder 15 is fixedly mounted on the shaft 59 which is rotatably mounted in the bearing members 60 that are carried by the brackets 61, the bearing members being keyed to the frame members 55 by the key and keyway combination indicated at 189, in this case so as to permit vertical adjustability of the bearing members. The vertical elevation of the bearings 60 as thus adjustably secured to the frame members 55 may be adjusted by means of the wedge plates 62 shown most clearly in FIGS. 8 and 8a on which the weight of the cylinder 15 rests by manual adjustment of the wedge adjusting bolts 63 whereby the bearing members 60 may be elevated and lowered so as to obtain the desired clearance between the cylinders 15 and 16.

The doffing cylinder 31 is fixedly mounted on the shaft 64 which is rotatably mounted in the bearing members 65 that are carried by the bracket 66, the bearing members being keyed to the frame members by the key and keyway combination indicated at 190 which permits vertical adjustability of the bearing members. The vertical disposition of the doffing cylinder 31 is adjustable by the wedges 67 whose relative position may be adjusted by the adjusting bolts 68. The clearance between the extremities of the teeth at the nip between the cylinders 15 and 16, and between the cylinders 16 and 31, preferably is as little as practical, e.g., about .003 to .005 inch. This also applies to the clearance at the nips between the cylinder 15 and feed rolls 21 and 22, between the cylinder 15 and the clearer roll 24, and between the cylinders 15 and 16 and clearer rolls 27 and 28.

The clearer roll 27 is mounted on the shaft 69 which is rotatably mounted in suitable bearing members 70 carried by the bracket 71 secured to the frame members 55. Similarly, the clearer roll 28 is mounted on the shaft 72 which is rotatably mounted in the bearing members 73 which are supported by the brackets 74 secured to the frame members 55.

At the upper extremities of the frame members 55 there are secured the bearing members 75 in which the shaft 76 is rotatably mounted, the shaft 76 carrying the fluted supply roll 20. The upper extremities of frame members 55 likewise have secured thereto the brackets 48 having a vertical slot 49 therein for holding the lap roll 19 for gravitationally resting on the supply roll 20. Conveniently, the outer member for providing the notch 49 may be hinged at 191 for facilitating putting the lap roll in place. This member may be held upright by a suitable latch (not shown).

As illustratively shown on an enlarged scale in FIG. 10 and also shown in FIGS. 8 and 8a, each of the bearing members 57, 60, 65, 70 and 73 has cowls; 77a, 77b, 77c, 77d and 77e, respectively, secured to the inner surface thereof in stationary relation thereto as by means of the bolts 78 (see FIG. 10). The cowls 77a, 77b, 77c, 77d and 77e provide a base for mounting for the cover means for the different rolls so as to be carried by the frame members 55. In the embodiment shown the cover means are made up from several parts which are secured in place by bolting them to the cowls. Thus, the cover means 37 for the cylinder 16 may be made up of the cover sections 37a, 37b, 37c, 37d and 37e bolted to the cowls 77a. Similarly, the cover means 38 may be made up of the sections 38a, 38b, 38c and 38d bolted to the cowls 77b. The cover means for the clearer roll 27 may be made up by utilizing the sections 39a, 39b and 39c bolted to the cowls 77d and in a similar manner, the cover means 40 for the clearer roll 28 may be made up of sections 40a, 40b and 40c bolted to the cowls 77e. The cover means 41 for the doffer cylinder 31 comprises the sections 41a and 41b bolted to the cowls 77c.

The cowls 77a, 77b, 77c, 77d and 77e likewise provide an end closure at each end of the cylinders and rolls which are in juxtaposed spaced relation to each end of the peripheral surface of each of the cylinders 15, 16 and 31 and each of the clearer rolls 27 and 28. This close clearance is illustrated in FIG. 10 in connection with the cylinder 16; and since the cover means are secured to the periphery of the cowls, it is apparent that access of air along the selvages of a web carried by the cylinders is prevented and that uniform conditions and control of air stream are caused to prevail throughout the entire extent of the cylinders from end to end thereof. The clearance between the cylinder ends and the cowls 77 desirably is as small as possible.

While there are different ways of mounting the cylinders so as to provide a small amount of clearance at each end, one such mounting means has been shown for purposes of illustration in FIG. 10. As aforesaid, the cylinder 16 is carried by the shaft 56, whose position can be shifted relative to the lateral bearings 79 and the thrust bearings 80. Referring to the right end of the shaft 56 as shown in FIG. 10, compression springs 81 are disposed between the end of the shaft 56 and the cap 82 which rotates with the shaft 56 but is held in spaced relation to the right-hand thrust bearing 80 by the spacers 83 and 84. At the left-hand end of the shaft 56 there is the cap 87 whose position in relation to the left-hand thrust bearing 80 is controlled by the spacers 85 and 85a. The position of the shaft 56 relative to the spacers 85 and 85a is adjustable by the adjusting bolts 87a. In this manner the disposition of the ends of the cylinder 16 which is rigidly mounted on the shaft 56 is accurately located and adjustable so as to provide a definite but, nevertheless, very small clearance between the cylinder ends and the cowls 77a. By thus employing a spring-loaded shaft clearance as low as 0.005 inch may be maintained at the end of each cylinder. Moreover, by employing the spring-loaded shaft better accommodation to expansion and contraction due to temperature changes is afforded. Means for rotating the cylinder 16 may be mounted on the spacer element 86 that is made rigid with the spacer 85a, as by being keyed thereto.

As shown clearly in FIG. 10 and also in FIGS. 8 and 8a, the frame members 55 are held in accurate spaced relation by means of the spacer bars 90.

Secured to the upper portion of the cowl 77b for the cylinder 15 and at each end of this cylinder there are secured the saddles 91 for mounting the feed rolls 21 and 22 and the feed roll clearer 24. In FIG. 8 the saddles 91 are shown with the bearing blocks for the feed rolls and feed clearer roll omitted, the position of these rolls merely being indicated by dotted lines. The shafts 92, 93 and 94 shown in FIG. 2, on which the feed rolls 21 and 22 and the clearer roll 24, respectively, are mounted, are rotatably mounted as shown in FIGS. 8 and 8a in the bearing blocks 95 which are held in place yieldably by the springs 96 that normally are held under compression by the cap members 97. The springs are a desirable safety means since the feed rolls are yieldable if a foreign body or large unmanageable fiber clump were to be fed in and, if desired, means may be provided for stopping the machine if these rolls are pushed back for any such reason. The saddles 91 also have secured thereto the brackets 98 for holding the pivot shaft 44 on which the cover 43 is pivotally mounted, as mentioned hereinabove.

In FIGS. 1 to 10 the driving mechanisms have not been shown in order that there may be greater clarity in the drawings. While the particular belt or drive arrangements may be varied as desired, a suitable drive has been shown in FIG. 11 for purposes of illustration. The carding cylinders 15 and 16 and the clearer rolls therefor are driven from the motor 100 by the belt 101 which passes in operative relation over the pulley 102 secured to the shaft 56 of the cylinder 16. From a pulley of corresponding size to the pulley 102 secured to the shaft 56 the cylinder 15 is rotated by means of the belt 103 which passes over the larger pulley 104 secured to the shaft 59 so as to rotate the cylinder more slowly than cylinder 16. In this manner cylinder 15 may be caused to rotate as, for example, at half the peripheral speed of the cylinder 16. The belt 101 likewise is operative to cause rotation of the pulley 105 which, through the belt 106 and pulley 107, rotates the shaft 69 and the clearer roll 27 mounted thereon at very high velocity. By the employment of the larger pulley 108, the belt 109 and the pulley 110, the shaft 72 and the clearer roll 28 mounted thereon may be rotated at a still higher velocity.

The doffer cylinder 31 is rotatable by a power supply means that may or may not be independent of the power supply means for the carding cylinder and adjustable relative thereto. In FIG. 11 the doffing cylinder 31 is shown as being rotated by power taken from motor means 111 by means of the belt 111a.

Any suitable means for causing a high speed reciprocation of the doffing comb 33 may be provided. In the system of drive shown in FIG. 11, the device for imparting reciprocatory motion to the comb 33 has been indicated diagrammatically by the reference character 112 and it may be supplied with power from the shaft 56 on which the cylinder 16 is mounted, by means of the belt connection 113. Any other source of power may, however, be provided for the device 112, but inasmuch as the doffing comb 33 should be moved at high speed, the high speed of rotation of the shaft 56 in normal operation of the machine provides a convenient source of power.

In FIG. 11 the power for the feed rolls 21 and 22 and for the feed roll clearer 24 has been shown as supplied from the power shaft 114 which effects rotation of the shaft 93 on which the roll 22 is mounted as by means of a worm 115 and worm gear 116. The shafts 92 and 94 are driven from the shaft 93 by any suitable means (not shown) such as intermeshing gears. The fluted supply roll 20 is driven from the shaft 92 by the belt 117. The power actuating means for the feed, like the power actuating means for the doffer cylinder, may or may not be independent of the driving means for the carding cylinders and the clearer rolls associated with the carding cylinders and adjustable relative thereto and to the doffing cylinder.

As is apparent particularly in connection with FIGS. 8 and 8a, each carding machine or unit is preferably paired in complementary relation with a second carding machine. Thus, as shown in these figures, the upstanding spaced frame members 55 are mounted at the bottom thereof on the base member 118 which is common to each machine of the complementary pair as shown in FIGS. 8 and 8a, respectively. Similarly, adjacent the top of the upstanding frame members 55 there are horizontally extending frame members 119 which likewise are common to the complementary pair of carding machines. Because of the complementary nature of the pair, the cylinders and rolls which rotate in a particular direction in one of the machines of the pair has a corresponding roll rotating in the opposite direction in the other machine of the pair. In this way vibrations are reduced to a minimum and the immovability and structural strength of the frame members for each machine are greatly enhanced. The vertical disposition of the working parts of each carding machine plays an important part in the attainment in a practical manner of the advantages which result from having the disposition of carding machines in complementary pairs having a common mounting frame.

In order that the advantages and features of this invention may be better understood, it will be described in connection with the utilization of the apparatus that has been described hereinabove. For commercial production, a high production rate is desirable, and it is one of the advantages of this invention that the carding machine that has been described hereinabove for purposes of illustration readily produces a fibrous web of cotton or synthetic fibers at the rate of 100 feet per minute with a throughput of fiber at the rate of 60 pounds per hour, the weight of carded web about 40 inches wide being about 219 grains per running yard.

A 1-pound lap may be used for feeding the carding machine, namely, a roll 40 inches wide wherein there are 7,000 grains (1 pound) of cotton per running yard. Accordingly, the lap is fed into the carding machine at the same rate that it is withdrawn, namely, 60 pounds per hour, which corresponds to a feed rate of 3 feet per minute. The 3 inch diameter feed rolls 21 and 22 are therefore rotated from the shaft 114 at the rate of 3.81 r.p.m. The breaker cylinder 15, which is 12½ inches in diameter, may be rotated at the rate of 660 r.p.m. At this rate of rotation the peripheral speed is such that the fibers, which as originally introduced weigh 7,000 grains per running yard, become attenuated so as to weigh about 9.7 grains per running yard during carriage on the periphery of this cylinder. On this cylinder there are 200 points per square inch presented by the teeth and on the basis of the conventionally accepted estimate for the number of cotton fibers per unit weight there are about 95 fibers per square inch or, conversely, about 2.15 points per fiber. In attenuating the fibers and stripping them from the relatively slow-moving feed rolls a very substantial amount of carding action takes place.

Additional very effective carding takes place in the region of the nip between the cylinder 15 and the main carding cylinder 16, which also has a diameter of 12½ inches, is rotated at the rate of 1,320 r.p.m., namely, at twice the peripheral speed of the cylinder 15. At the nip between the cylinders 15 and 16 the fibers are largely individually dragged over the edge 46 shown in FIG. 3 and become attenuated on the surface of the cylinder 16 at the rate of 4.85 grains per running yard. For ordinary cotton, the fiber distribution is at the rate of about 48 fibers per square inch and since there are 250 points per square inch there are about 5.3 points per fiber.

By virtue of the carding action provided by the cylinders 15 and 16 in initially picking the fibers from the lap originally introduced, in further attenuating the fibers about the edge 46 and by the action of dragging the fiber against the inner surfaces of the cover means 37 and 38, an extremely effective carding of the originally introduced fibers is afforded. The carding being completed, the carded fibers may then be condensed on the doffing cylinder 31, which is rotated so that its peripheral speed will be 100 feet per minute, as aforesaid.

The clearer rolls 27 and 28, when used, may be operated at high speed, e.g., so that the peripheral speed will be about 1.25 times that of the cylinders 15 and 16, respectively.

By virtue of the employment of applicant's invention may advantages are afforded as contrasted with utilization of conventional carding equipment. One of the most notable improvements which has been obtained according to the applicant's invention is that of greatly increasing the capacity of a carding unit as regards the quantity of fiber that may be successfully passed through the machine. In a conventional carding machine the main carding cylinder is 50 inches in diameter and it is rotated at 165 r.p.m. The original lap is not fed directly onto the main carding cylinder but is fed onto a licker-in roll about 9 inches in diameter which is rotated at about 475 r.p.m. The doffer cylinder is 27 inches in diameter and may be rotated at different speeds, which usually run about 10 r.p.m. but may range from 6 or 7 r.p.m. to as high as 14 r.p.m.

According to well established practice cotton fiber is subjected to carding using a conventional carding machine at the rate of about 10 pounds per hour. If a continuous stripper is used for exercising a clearing effect on the main cylinder, then a carding machine may be operated about four to seven days without stopping the machine to clean it by brushing out cotton which has become embedded in the teeth on the carding cylinder. The action of a continuous stripper has a dulling action on the sharpness of the points presented by the carding cylinder that in turn has an adverse effect on the quality of the carding. It is for this reason that a continuous stripper is used in connection with the production of lower grade carding. For fine work, a continuous stripper is not utilized and in such case even when the feed is at the rate of only 10 pounds per hour the carding machine must be taken out of operation and manually cleaned once about every four hours. This is, of course, an expensive operation both for labor and because of interference with production.

If attempt is made to increase the rate of feed into a conventional card without resort to using a continuous stripper it is a practical impossibility to go above substantially 10 pounds per hour. Even when a continuous stripper is employed, a conventional carding machine will not run longer than about twenty-four hours at a feed rate of 15 pounds of cotton per hour without requiring stoppage for cleaning. Any further increase of feed rate is not possible or practical. Thus at a feed rate of 20 pounds of cotton per hour the conventional carding machine can be run for only about an hour before stoppage for cleaning becomes necessary due to the cotton loading into the teeth on the carding cylinder. Such overloading occurs in only ten minutes when the feed is at the rate of 30 pounds per hour of cotton and occurs in only three or four minutes when the rate of feed is 60 pounds per hour. By contrast to this very limited capacity of a conventional carding machine, attention may be called to the foregoing example wherein the carding machine has a continuously maintained throughput of 60 pounds per hour of cotton. At this rate of throughput no loading of any kind occurs and the operation may be carried on indefinitely. Moreover, there is no indication that 60 pounds per hour is an upper limit and even a greater rate of throughput may be afforded using the apparatus of this invention.

In a conventional carding machine there are many more teeth on the clothing for the main carding cylinder than are actually employed for the purposes of carrying attenuated fibers. Thus when the cotton is fed to a conventional carding machine at the rate of 10 pounds per hour and the 50-inch main carding cylinder is rotated at the standard rate of 165 r.p.m., the fibers become distributed so that there are only about 17 fibers per square inch occupied by 500 teeth. In other words, there are about 30 teeth per fiber carried by the main carding cylinder. This is more teeth than required for carding, but experience has shown that this is substantially the limit for practical carding without the cotton working down into the teeth so that the loading of cotton fiber into and among the teeth becomes excessive. It is the loading tendency of an ordinary carding machine which limits its capacity for carding fiber.

The ability to handle a large throughput of fiber without loading and utilizing the apparatus of this invention is due primarily to the combination of two factors. One of these factors is that the forward faces of the teeth are radially disposed, namely, without any substantial forward rake in whole or in part, with the result that the fiber is at all times free to fly off the teeth under the influence of centrifugal force. To assist in bringing this about the clothing may, if desired, be buffed so that the teeth will be smooth and will not present any burrs or roughness. The other of these factors is that by utilization of a smaller carding cylinder and a higher speed of rotation the centrifugal force which exercises an unloading effect is greatly increased. Thus in connection with the foregoing sample wherein the breaker cylinder 15 has a diameter of 12½ inches and is rotated at 660 r.p.m. the peripheral speed is substantially the same as that of the main carding cylinder of a conventional carding machine which has a diameter of 50 inches and is rotated at 165 r.p.m. However, the centrifugal force at the surface of the breaker cylinder 15 is four times the centrifugal force at the surface of the main cylinder of the conventional carding machine. This phenomenon can be explained by reference to the fact that whereas centrifugal force increases directly as the diameter is increased, it increases in proportion to the square of the rotational speed.

With further reference to the foregoing example, it may be pointed out that for the main carding cylinder 16, which is rotated at 1,320 r.p.m., the centrifugal force at the surface is sixteen times that which prevails at the surface of the main cylinder of the conventional carding machine. Such greatly increased centrifugal force aids to a very great extent in providing an unloading tendency which keeps the teeth on the carding cylinders clear and enables these carding cylinders to be run for very prolonged periods of time without the necessity for cleaning and even though the throughput of fiber is several times that which is possible in the case of a conventional carding machine.

While a greater capacity for handling fiber is provided utilizing the apparatus of the applicant's invention, the carding action is highly effective and in certain respects is improved as compared with that which is possible using a conventional carding machine. Even though the throughput of fiber is as great as 60 pounds per hour, the distribution of attenuated fibers on the breaker cylinder 15 is such that there are slightly over 2 teeth per fiber for providing effective fiber attenuation. This becomes increased to about 5.3 teeth per fiber on the main carding cylinder. It also may be pointed out that even though there may be 250 teeth per square inch presented by the main cylinder, as mentioned in the foregoing example, as compared with 500 teeth per square inch in the case of the clothing for the main carding cylinder of a conventional carding machine, the number of teeth which pass a given point per unit time is the same due to the fact that the peripheral speed of the main cylinder 16 is double the peripheral speed of the main cylinder of a conventional carding machine. In this way a lesser number of teeth per square inch may be used without sacrifice of carding effectiveness and, by reason of the lesser number of teeth and the provision of valleys behind the teeth, the capacity to carry a large throughput of fiber is greatly increased.

Another highly significant feature of the applicant's invention is that the carding machine requires very little floor space. The carding machine, notwithstanding its high capacity, only requires 1½ feet. By contrast, a conventional carding machine is about 10 feet long. If a 2-foot space for use by an operator is allowed for each machine, then it is apparent that whereas a conventional carding machine requires 12 feet of floor space, each carding unit according to the applicant's invention requires only 3½ feet.

The foregoing comparison, as regards floor space occupied, is on the basis of floor space occupied per carding machine without regard to the capacity of the machine for handling fiber. When the matter of capacity is also taken into consideration, namely, that each carding unit according to the applicant's invention can handle six times and more the amount of fiber that can be handled by a conventional carding machine, then it becomes apparent that a battery of four of the carding machines of the applicant's invention which occupy only 14 feet when placed in line can handle as much weight of fiber as twenty-four conventional carding machines which, if placed in line, would require about 288 feet of floor space.

Another unique advantage of the applicant's invention results from the fact that the apparatus of the applicant's invention can successfully card fibers which run substantially shorter in length than those which are capable of being satisfactorily carded using a conventional carding machine. For example, while longer fibers may be carded very well using the apparatus of the applicant's invention, one can produce very satisfactory carding using cotton fiber in the range from about ½ to about ¾ inch in length and even as short as ⅜ inch. In the use of a conventional carding machine the fiber length is about ⅞ inch or longer. Fiber lengths of about ⅝ inch are about as short as is in any way consistent with carding using a conventional carding machine without the occurrence of excessively rapid loading. The shorter fibers are, of course, cheaper and for many purposes other than spinning the shorter fibers result in a satisfactory product.

Experience has shown that the carding machine of the applicant's invention does a highly effective job in breaking up clumps, snarls and pills of fiber so that the fibers become distributed very uniformly in a carded sheet. However, while the carding action is highly effective, there is a minimum tendency to fracture the fibers and there is a very substantially reduced tendency in this respect as compared with a conventional carding machine. In a conventional carding machine the action of the flats or rolls on the peripheral surface of the main carding cylinder is particularly prone to result in fracture of the fibers due to the relatively violent combing action of the fibers caused by rapid movement of the doffing teeth in operative contacting relation with the substantially stationary teeth of the flats or rolls.

In the apparatus of the applicant's invention there is in addition a self-equalizing capacity which promotes evenness of fiber distribution from selvage to selvage. When the fibers are confined underneath the cover means in an air stream which is propelled by the teeth, air tends to move to that area which to the least extent is occupied by the fibers, but in so doing it tends to carry fibers therewith so that the zone which may have been relatively lean in fibers has additional fibers carried thereto. Because of this action, the resulting carded web does not have the striations that are typical of webs produced by conventional carding machines. Moreover, due to the confinement at the ends of the cylinders this same action causes the passage means underneath the covers to be uniformly occupied throughout, with the result that the web has uniform characteristics right up to each selvage. In the case of conventional carding machines, on the other hand, there is a zone of about 2 inches adjacent each selvage wherein there is non-uniformity of fiber distribution and when such carded webs are used in web form the selvages usually have to be trimmed.

When using the embodiment of this invention shown in FIGS. 1 to 11, the carding action is substantially different from that of a conventional carding machine in that the fiber direction is distributed more uniformly in all directions rather than having an orientation primarily in the direction of travel of the web through the carding action, as is the case when a conventional carding machine is employed. When laminated webs are employed using the output of a conventional carding machine, it frequently is necessary to cross-lay the carded webs at considerable cost for both extra labor and machinery so as to impart more uniform strength characteristics in different directions. Because of the carding action of the applicant's apparatus, it is possible to produce impregnated laminated fibrous sheets which have substantially greater lateral strength in relation to longitudinal strength than is possible using a conventional carding machine without resort to a cross-laying operation. Moreover, because of the better fiber integration, greater strength is obtained in all directions. While the action which takes place is not altogether understood and this invention is not to be regarded as dependent upon any theory advanced herein, it is believed that whereas in the operation of a conventional carding machine the fibers are held on the main carding cylinder by teeth disposed at an angle and are taken therefrom by being directly snagged and torn away by the teeth presented by the doffing cylinder, with the result that the fibers in large measure become draped about the teeth of the doffing cylinder with a hairpin curve therein and with the bulk of the fiber lengths drawn out primarily in the machine direction, the carding machine of the present invention operates in a different way in that the teeth on the doffing cylinder are not required to unload the fibers from the radial teeth of the carding cylinder but merely act as an obstruction or dam which causes the fibers to pile up on one another and become packed by the action of the advancing teeth on the carding cylinder as they pile up in a largely heterogeneously distributed condition somewhat in advance of the nip made with the doffing cylinder. The fibers having been condensed into a web in this way, the cover means overlying the doffing cylinder serves to preserve the condensed and compressed condition of the fibers and the doffing cylinder acts primarily as a carrier to carry off in the form of a web the fibers that have become condensed and compacted on each other in a confined space somewhat prior to transfer to the doffing cylinder.

As compared with systems utilizing felting of fibers, the carding machine of the invention is of advantage in the better control and uniformity of fiber distribution which are obtainable.

If it is considered desirable to further refine the carding action, particularly with regard to orientation of average or relatively long fibers in one direction, the carding machine of this invention may be modified as exemplified in FIGS. 12 and 13. This modification has for its primary purpose the bringing of attenuated fibers carried on one of the carding cylinders into working contact with flats of the type used in conventional carding machines.

Referring more particularly to the apparatus which has been shown schematically in FIGS. 12 and 13, the feed mechanisms may be as in the previous embodiment including the lap roll 19, the fluted supply roll 20 and the feed rolls 21 and 22 between which the lap 23 is fed. Moreover, there may be associated with the feed roll 22 the clearer roll 24 and the cover 43.

The lap is fed onto the surface of the carding cylinder 150 which presents the teeth 151. Fibers carried on the cylinder 150 are transferred to cylinder 152 so as to be carried by the teeth 153 presented thereby. The fibers are again transferred to another carding cylinder 154 so as to be carried by the teeth 155 presented thereby. While being carried on the surface of the cylinder 154, the attenuated fibers come into contact with the flats 156 which are slowly moved by the rotation of the rolls 157 and 158 so that the working surfaces of the flats 156 which present pins (not shown) may be moved to position where the flats may be cleaned. A clearer brush 192 may be provided for clearing the flats. The carding is thus completed on the cylinder 154 and the resulting carded web is removed therefrom by the doffing cylinder 159, whose teeth 160 are set at an angle for permitting the condensation of the attenuated fibers thereon. After travel on the surface of the doffing cylinder 159 the fibers may be separated therefrom by an oscillating comb or the like 161 and the resulting web 34 may be taken away as by means of a continuous conveyor such as the conveyor 35 that has been described in connection with FIGS. 1 to 11. Alternatively, the carded web may be condensed to sliver form by the member 185, passed between the calender rolls 186 and taken into the coiling can 187. In FIG. 13 there have been illustrated certain aspects of structure which are preferably employed in rotatably mounting the cylinders 150, 152, 154 and 159. The main frame for these cylinders comprises the spaced upright frame members 163 which are rigidly mounted on the base 164. The shaft 165 which carries the cylinder 154 is rotatably mounted in the bearing blocks 166 which are held in the brackets 167 under spring load provided by the springs 168 and 169 so that in the event of a foreign body being encountered a certain amount of give will be provided for minimizing possible injury to the apparatus.

The shaft 170, upon which the cylinder 152 is mounted is similarly mounted, for rotation utilizing the bearing blocks 171 which are held in the brackets 172 and under spring load provided by the springs 173 and 174. However, so that the clearance between the extremities of the teeth presented by the cylinders 152 and 154 may be adjusted, the vertical position of the cylinder 152 may be adjusted as by the inclined wedge means 175, which may be adjusted by the bolts 176.

The mounting for the cylinders 150 and 159 preferably corresponds to that shown in FIG. 13 with reference to the cylinder 152. To assist in keeping the teeth presented by the cylinders 150, 152 and 154 as clear as possible, the clearer rolls 177 and 178 may be employed.

As in the embodiment of this invention shown in FIGS. 1 to 11, cover means is employed throughout the portion of the machine wherein carding is effected. Thus the cylinder 150 is provided with the cover means 179 having its inner arcuate surface in juxtaposed spaced relation to the teeth presented by this cylinder. The cylinder 152 has cover means 180 of similar character therefor. When clearer rolls are positioned as shown in FIGS. 12 and 13, the cover means 181 and 182, respectively, may be extended thereover. Cover means 183 is provided for the cylinder 154, and is to be regarded as including the flats 156 which in effect provide the cover means presenting a special carding surface. During operation the flats become loaded and the pins on the flats project only slightly from the fibers loaded there so as to provide a rough carding surface. Some of the flats are disposed so there is only a very small clearance between them that becomes effectively closed by the fibers, the bulk of the fibers being carried past the flats with a carding action and thence under the metal covers. In lieu of flats, other means may be utilized for providing a confining surface that is rough for accentuating the carding action.

The teeth 151, 153 and 155 for the cylinders 150, 152 and 154, respectively, are radial teeth which may be similar to those shown in FIGS. 7c and 7e.

By way of example, the apparatus shown in FIGS. 12 and 13 may be set up utilizing 12½ inch diameter cylinders for the cylinders 150, 152, 154 and 159, and the clearances between these cylinders, the covers therefor, and the feed rolls preferably are of the order exemplified in connection with FIGS. 1 to 11. The carding cylinders 150, 152 and 154 may be rotated in the same direction, as shown by the arrows, and at speeds of 600 r.p.m., 800 r.p.m. and 1,200 r.p.m., respectively. The rate of feed and the rate of rotation of the doffing cylinder 159 may be controlled as desired with reference to the amount of fiber carried by the carding cylinders and the amount of condensation which is desired on the doffing cylinder 159.

While this invention has been described in connection with certain embodiments of this invention and examples, it is to be understood that this has been done merely for purposes of illustration and that the apparatus and its operation may be varied substantially without departing from that which constitute the essential features of the invention. Moreover, while it is preferable that the features of this invention be practiced concurrently, certain of the features of the invention may be practiced independently without, however, obtaining the benefit of their conjoined action.

With regard to the proximity of the inner surface of the cover means for the carding cylinders, the primary consideration is that the cover means be in such proximity to the teeth presented by the cylinders that the teeth control the current of air in the passage which is occupied by the teeth between the inner surface of the cover means and the base of the teeth. If there is sufficient air space in the region where the attenuated fibers are being carried so that the air overlying the teeth in effect splits and the air immediately adjacent the inner surface of the cover means moves considerably slower than the air in contact with the teeth, then the fibers which come into the slower moving air tend to slow down with a resulting tendency for the fibers to ball up into pills and clumps. When, however, the air in the arcuate space underneath the cover means is under the substantial control of the teeth in being propelled thereby, then the fibers, whether mechanically hooked by the teeth or in free condition in the air stream above the teeth, move with the teeth and the air stream which is propelled thereby. When this condition obtains, the movement of fibers may be effected notwithstanding the radial disposition of the forward faces of the teeth. In conventional carding mechanisms, on the other hand, teeth having a portion set at a forward inclination serve to retain the fibers notwithstanding centrifugal force, but this presents the loading difficulties aforesaid and the air in the vicinity of the mechanisms is uncontrolled with resultant non-uniformity of the web of carded material that is produced.

In order that the proper control of the air may be afforded, it is advisable that the clearance between the inner surface of the cover means and the extremities of the teeth presented by the carding cylinder be not greater than one-third and preferably not greater than one-fifth of the height of the teeth. Thus when the teeth are substantially .1 inch in height the clearance of the inner surface of the cover means should not be over about .03 inch and it is preferable that the clearance be of the order of .02 or .015 inch as in the specific example hereinabove described. There is no lower limit in this regard except for large fiber throughput and that the clearance should be consistent with manufacturing tolerances so that the teeth will not strike the inner surface of the cover means. The height of the teeth and the clearance may be varied somewhat depending upon the weight of fiber that is carried through the carding machine and the type of fiber. Thus when the throughput of fiber is decreased, the height of the teeth and the clearance for the covers preferably is decreased so as to be substantially less than when the amount of fiber passed through the machine is large. For example, if the amount of fiber is decreased so as to be of the order of 15 to 20 pounds per hour during carding, it is preferable to decrease the cover clearance so as to be about 0.005 inch. On the other hand, if the amount of fiber exceeds 60 pounds per hour, somewhat heavier teeth and a greater clearance for the covers than .03 inch is consistent with satisfactory carding, for the fibers in such case would be in such quantity as to occupy the space and control of the air within the space would be such that satisfactory carding would be possible. These comments also apply to the carding of fibers heavier than cotton fibers such as bast fibers.

The clearances at the nips between the cylinder and rolls preferably are as close as may be reasonably expected in good machine manufacture. Such clearances may be of the order of 0.005 inch as aforesaid, but 0.003 inch is better. When the clearances, especially in the transfer zones associated with the carding cylinders, exceed about 0.01 inch the quality of the carding is considerably impaired. Similarly, if the clearances between the cylinder ends and the end closures are as great as 0.01 inch, then the escape of air tends to impair the uniformity of the carded web adjacent its selvages.

When in the specification and in the claims the proximate relationship of the cylinders, end closures and covers is referred to as "proximate spaced relation" it is intended that the clearances be of the order that have been exemplified and described herein.

The apparatus of this invention may be employed for many kinds of fiber. It is especially suitable for cotton and synthetic fibers such as nylon, Orlon, Dacron, etc., but it also may be used for wool and asbestos, and, as noted above, bast fibers, e.g., sisal.

The foregoing as to variations depending on the intended capacity of the carding machine also applies to the number of teeth per square inch used on the carding cylinders. For an operation as described in connection with the foregoing example wherein the cotton is carded at the rate of 60 pounds per hour the employment of 250 to 300 teeth per square inch is preferable. However, for carding at a lower rate such as 10 or 20 pounds of cotton per hour a larger number of teeth per square inch may be employed such as, for example, 350 teeth per square inch for the carding cylinder which rotates at the higher speed. For the carding cylinder which rotates at lower speed, a considerably less number of teeth per square inch may be employed. As a general rule, the number of teeth per square inch presented by cylinders rotating at different peripheral speeds are different so as to facilitate the transfer of attenuated fibers from one cylinder to the other.

In the practice of this invention differences in the peripheral speed of different cylinders may be effected either by differences in the rate of rotation or differences in the diameter. While in the embodiments hereinabove described the cylinders employed have been shown as having the same diameter, this is not essential although it is advantageous from the machine design standpoint. However, in any case, the employment of cylinders whose diameter is of the order of 12 to 16 inches is preferable because, as pointed out above, maximum centrifugal force tending to unload the teeth may be provided in this way for a given desired peripheral speed.

The carding cylinders preferably are of the order of 12.5 inches in diameter when carding a web 40 inches wide. However, when carding a web 60 inches wide it may be desirable to employ cylinders 16 inches in diameter so as to provide greater rigidity over the longer span. Similarly for carding a web 80 inches in width it is desirable that the cylinder diameter be about 18 inches in diameter. However, in order that one may obtain the advantage of a high centrifugal force tending to unload fiber from the carding cylinder it is preferable that the diameter be of the order of 10 to 20 inches and that at least in the case of the main carding cylinder it be rotated at the rate of at least 800 r.p.m. and, still better, at 1,000 r.p.m. or higher.

It is also to be understood that the figures given for speed of rotation of the different cylinders are merely illustrative and that the carding may be effected at widely different speeds. Cylinder speeds as high as 2,200 r.p.m. have been successfully employed. The relative speeds of the carding cylinders may also be considerably varied. Thus in the carding of very short fibers, the fibers may be transferred from one carding cylinder to another whose peripheral rate of travel is about 50% greater than that of the cylinder on which the fibers are initially carried. On the other hand, when the fibers being handled are relatively friable, the speed of the breaker cylinder which is used to initially take the fibers from the lap which is fed into the machine may be only one-half or even one-quarter the speed that has been described hereinabove in connection wth the specific example.

The carding machine of this invention is of great utility for the carding of synthetic fibers as a preliminary to spinning, e.g., nylon, rayon, Orlon, Dacron and the like. Such fibers are produced in continuous filaments and for spinning purposes these filaments are cut into staple lengths and are subjected to carding to form a carded web which is condensed into a sliver that may be stored in the conventional coiling cans used for feeding machines used for spinning. Synthetic fibers such as these do not require any cleaning preliminary to spinning. By utilizing a carding machine such as that disclosed in FIGS. 1 to 11, a highly perfected sliver of synthetic fiber may be produced at the rate of 60 pounds or more per hour as compared with 10 pounds per hour when a conventional carding machine is used for the purpose.

Moreover, since synthetic fibers can be produced in any length and since the longer lengths result in a better spun yarn, it is an advantage of the carding machine of this invention that it can successfully handle longer fibers than can be successfully carded on a conventional carding machine.

When the carding machine of this invention is used to prepare a sliver for spinning, a unit such as that shown in FIGS. 1 to 11 may have associated therewith means conventional in the art whereby the carded web is condensed into a sliver and whereby the sliver is coiled in a coiling can, e.g., as shown in FIG. 12. If the output of the carding machine is inconveniently low down for coiling, the web as initially produced by the carding unit may be elevated as by mounting the belt 35 so that a portion of its travel will be vertical. Alternatively, since the fiber is under positive control in its passage through the carding machine, the essential elements of the carding machine may be reversed from the point of view of vertical disposition so that, as compared with the disposition of the cylinders shown in FIGS. 1 to 11, the breaker cylinder 15 would be underneath the main carding cylinder 16 together with means for feeding the fiber lap thereon, and the doffing cylinder 31 would be immediately above the main cylinder 16. By so doing the carded web as separated from the doffing cylinder would be at a convenient height for condensation and being fed into a coiling can.

I claim:

1. In a carding machine the combination comprising a first rotatable cylinder, a second rotatable cylinder, means for mounting said cylinders for rotation about parallel axes, means for rotating said cylinders in the same direction with the peripheral speed of said second cylinder substantially greater than that of said first cylinder, a multiplicity of teeth presented by the surfaces of said cylinders, the forward faces of which are disposed substantially in alignment with prolongations of radii from the respective axes of rotation of said cylinders, said cylinders being disposed with said teeth presented thereby in juxtaposed spaced relation at the nip between said cylinders, and cover means for said first and second cylinders in juxtaposed spaced relation to the extremities of said teeth adapted to direct attenuated fibers with a stream of air confined by said cover means for said first cylinder and travelling with said first cylinder propelled by said teeth toward said nip and from said nip with a stream of air confined by said cover means for said second cylinder and travelling with said second cylinder propelled by said teeth, said cover means for said first and second cylinders, respectively, meeting on the side of said nip approached by the surface of said first cylinder to define an edge disposed longitudinally along said nip over which attenuated fibers propelled by teeth of said first cylinder pass with substantial reversal of the direction of movement thereof for travel with said second cylinder propelled by the teeth thereof.

2. A carding machine comprising a first cylinder presenting a multiplicity of teeth having substantially radially disposed forward faces, a second cylinder presenting a multiplicity of teeth having substantially radially disposed forward faces, means for mounting said cylinders for rotation about parallel axes with said teeth in juxtaposed spaced relation at the nip between said first and second cylinders, means for rotating said cylinders in the same direction with the peripheral speed of said second cylinder substantially greater than that of said first cylinder, cover means for said first and for said second cylinders respectively, disposed with opposed margins on the side of said nip approached by the direction of travel of said first cylinder in immediately adjacent relation to said nip and with the inner surfaces thereof in juxtaposed spaced relation to the extremities of said teeth whereby said teeth are effective to propel air therewith relative to said covers during rotation of said cylinders, means for distributing attenuated fibers onto said first cylinder to be carried to said nip with a stream of air confined by said cover means and moving with the surface of said first cylinder propelled by said teeth presented thereby, the said teeth presented by said first and second cylinders being exposed at said nip adjacent said opposed margins of said cover means for transfer of attenuated fibers from said first cylinder to said second cylinder whereon said fibers are carried from said nip with a stream of air confined by said cover means and moving with the surface of said second cylinder propelled by said teeth presented thereby, and means for removing the attenuated fibers so transferred to and carried by said second cylinder from its surface during rotation thereof.

3. In a carding machine the combination comprising a first rotatable cylinder, a second rotatable cylinder, means for mounting said cylinders for rotation about parallel axes, means for rotating said cylinders in the same direction with the peripheral speed of said second cylinder substantially greater than that of said first cylinder, clothing for said first and second cylinders comprising a multiplicity of teeth, said teeth having the forward faces thereof substantially in alignment with prolongations radial from the respective axes of rotation of said cylinders, and said teeth being in juxtaposed spaced relation at the nip between said cylinders, and cover means for said first and second cylinders having opposed margins on the opposite sides of said nip and having inner arcuate surfaces spaced from the extremities of said teeth by a distance not greater than about one-third the height of said teeth whereby said teeth are effective to carry fibers with the surface of said cylinders, respectively, in an air stream propelled by said forward faces of said teeth under the confinement provided by said cover means during rotation of said cylinders.

4. A carding machine according to claim 2 wherein the inner surface of said cover means is spaced from the outer extremities of said teeth by a distance not greater than about one-third the height of said forward faces of said teeth.

5. A carding machine according to claim 4 wherein the clearance between the extremities of said teeth and the inner surface of said cover is less than 0.3 inch.

6. A carding machine comprising a first cylinder presenting a multiplicity of teeth having substantially radially disposed forward faces, a second cylinder presenting a multiplicity of teeth having substantially radially disposed forward faces, means for mounting said cylinders for rotation about parallel axes with said teeth in juxtaposed relation at the nip between said cylinders, means for rotating said cylinders in the same direction with the peripheral speed of said second cylinder substantially greater than that of said first cylinder, feeding means for feeding fibers onto said teeth presented by said first cylinder, removing means for removing attenuated fibers from said teeth presented by said second cylinder, first cover means overlying said first cylinder for confining fibers between said feeding means and said nip, second cover means overlying said second cylinder for confining fibers during travel from said nip toward said removing means, said first and second cover means having inner surfaces in juxtaposed spaced relation to the extremities of said teeth, said first and second cover means meeting on the side of said nip approached by the surface of said first cylinder to define an edge disposed longitudinally along said nip having a pocket thereunder and extending thereto and therealong substantially throughout its length overlying the teeth presented by said second cylinder.

7. A carding machine comprising in combination a first cylinder having a multiplicity of teeth presented by its peripheral surface having substantially radially disposed forward faces, a second cylinder having a multiplicity of teeth presented by its peripheral surface having substantially radially disposed forward faces, means for mounting said cylinders for rotation about parallel axes with said teeth in juxtaposed spaced relation at the nip between said cylinders, means for rotating said cylinders in the same direction with the peripheral speed of said second cylinder substantially greater than that of said first cylinder, cover means for said first cylinder disposed on opposite sides of said nip and having opposed margins extending into said nip leaving a space therebetween in the zone immediately adjacent said nip and having arcuate inner surfaces spaced from the extremities of said teeth by a distance not greater than one-third the height of said teeth, said cover means for said second cylinder being disposed on opposite sides of said nip and having opposed margins extending into said nip leaving a space therebetween in the zone immediately adjacent said nip and having arcuate inner surfaces spaced from the extremities of said teeth by a distance not greater than one-third the height of said teeth, said opposed margins of said cover means for said second cylinder being spaced apart substantially further than the opposed margins of said cover means for said first cylinder so as to provide a pocket extending along at least one of said margins of said cover means for said first cylinder and between it and said teeth presented by said second cylinder.

8. A carding machine according to claim 7 wherein said opposed margins of said cover means for said second cylinder are disposed to provide a pocket along each of the opposed margins of said cover means for said first cylinder and between said margins, respectively, and said teeth presented by said second cylinder.

9. In a carding machine, the combination comprising a first cylinder presenting a multiplicity of teeth having radially disposed forward faces, a second cylinder presenting a multiplicity of teeth having radially disposed forward faces, means for mounting said cylinders for rotation about parallel axes with the extremities of said teeth in juxtaposed spaced relation along the nip between said cylinders, means for rotating said cylinders in the same direction with the peripheral speed of said second cylinder substantially greater than that of said first cylinder, a third cylinder presenting a multiplicity of teeth having rearwardly inclined rear surfaces and mounted for rotation about an axis of rotation parallel to that of said second cylinder with the extremities of said teeth in juxtaposed spaced relation to the extremities of the teeth presented by said second cylinder, means for rotating said third cylinder in the opposite direction with respect to the direction of rotation of said second cylinder and at a substantially lesser peripheral speed, fiber feeding means for feeding fibers onto said first cylinder, first cover means for said first cylinder having an arcuate inner surface in proximate spaced relation to the extremities of said teeth presented by said first cylinder for confining fibers during travel from said fiber feeding means to the nip between said first and second cylinders, second cover means for said second cylinder in proximate spaced relation to said teeth presented by said second cylinder for confining fibers during travel from the nip between said first and second cylinders to the nip between said second and third cylinders, said first and second cover means meeting immediately adjacent the nip between said first and second cylinders along a longitudinally disposed edge over which attenuated fibers are dragged during transfer from said first to said second cylinders, said second cover means extending to immediately adjacent the nip between said second and third cylinders for confining fibers whose travel with the teeth presented by said second cylinder is checked by the action of the teeth presented by said third cylinder, third cover means for said third cylinder in proximate spaced relation to the extremities of said teeth presented by said third cylinder for confining fibers thereunder in being carried from said nip between said second and third cylinders on the teeth presented by said third cylinder, and means for doffing fibers so carried from said third cylinder.

10. A carding machine comprising in combination first and second cylinders of the order of 10 to 20 inches in diameter, said cylinders presenting a multiplicity of teeth having radially disposed forward faces of the order of 0.1 inch in height, means for mounting said cylinders for rotation about substantially parallel axes with the clearance between the extremities of said teeth of the order of 0.005 inch, means for rotating said cylinders in the same direction with the peripheral speed of said second cylinder substantially greater than that of said first cylinder, fiber feeding means for feeding fibers onto said first cylinder, first cover means for said first cylinder having an inner arcuate surface which clears the extremities of said teeth presented by said first cylinder by not more than about 0.02 inch for confining fibers thereunder during travel from said fiber feeding means to the nip between said first and second cylinders, a third cylinder presenting a multiplicity of teeth having rearwardly inclined rear faces and mounted for rotation about an axis parallel to the axis of rotation of said second cylinder with the clearance between said teeth and the teeth presented by said second cylinder not more than about 0.005 inch, means for rotating said third cylinder in the opposite direction to that of said second cylinder and at a substantially lesser speed, second cover means for said second cylinder having an inner arcuate surface which clears the extremities of said teeth presented by said second cylinder by not more than 0.02 inch for confining fibers thereunder during travel of fibers from said nip between said first and second cylinders and the nip between said second and third cylinders, and third cover means for said third cylinder which clears the extremities of the teeth presented by said third cylinder by not more than about 0.03 inch for confining fibers thereunder in moving away from the nip between said second and third cylinders.

11. A carding machine according to claim 10 wherein there is an end closure at each end of at least said first and second cylinders and clears each said end of said cylinders by not more than about 0.005 inch disposed for closing off the arcuate spaces between the peripheral surfaces of said cylinders and the inner surfaces of said first and second cylinders.

12. In a carding machine the combination comprising a carding cylinder presenting a multiplicity of teeth having radially disposed forward faces, a doffing cylinder presenting a multiplicity of teeth having rearwardly inclined rear faces, means for mounting said carding cylinder and said doffing cylinder for rotation about parallel axes with the extremities of said teeth presented respectively thereby in juxtaposed spaced relation at the nip between said carding cylinder and said doffing cylinder, means for rotating said cylinders in opposite directions with rotation of said carding cylinder in the direction of the forward faces of said teeth and the peripheral speed of said doffing cylinder substantially less than the peripheral speed of said carding cylinder, fiber feeding means for feeding fibers for distribution in attenuated relation on said teeth presented by said carding cylinder, cover means for said carding cylinder, the inner surface of which is in juxtaposed spaced relation to the extremities of the said teeth presented by said cylinder from immediately adjacent the side of said nip approached by said carding cylinder during its rotation toward said fiber feeding means for passage thereunder of fibers fed by said feeding means and confining cover means in juxtaposed spaced relation to the extremities of said teeth extending in the direction of rotation of said carding cylinder from adjacent said nip to adjacent said fiber feeding means.

13. Apparatus for integrating unspun fibers which comprises a complementary pair of carding machines, each of which comprises a first carding cylinder, a second carding cylinder for receiving fibers from said first cylinder and a doffing cylinder for receiving carded fibers from said second cylinder, common frame means for rotatably mounting all of said cylinders about parallel axes, means for rotating the cylinders of one of said machines in the opposite direction to the corresponding cylinders of the other machine with the peripheral speed of said second cylinder substantially greater than that of said first cylinder, said cylinders of each machine of said pair being mounted one above the other, fiber feeding means for feeding fibers onto said first cylinder, air propelling teeth presented by said first and second carding cylinders, first cover means for said first cylinder having its inner surface in juxtaposed spaced relation to said teeth for confining fibers thereunder from adjacent said fiber feeding means to the zone of transfer of fibers from said first cylinder to said second cylinder, and second cover means for said second cylinder having its inner surface in juxtaposed spaced relation to said teeth for confining fibers thereunder from said zone of transfer to the zone of transfer of said fibers from said second cylinder to said doffing cylinder.

14. In a carding machine, the combination comprising a carding cylinder secured to a shaft, bearing means for rotatably mounting said shaft, a thrust bearing comprised in said bearing means adjacent each end of said shaft relative to which said shaft is longitudinally adjustable, spring load imposing means cooperating with said thrust bearing for holding said shaft in constant longitudinal position relative to said thrust bearing, and means for adjusting the setting of said longitudinal position of said shaft relative to said thrust bearing.

15. In a carding machine, the combination comprising a first cylinder presenting a multiplicity of teeth having substantially radially disposed forward faces, a second cylinder presenting a multiplicity of teeth having substantially radially disposed forward faces, means for mounting said cylinders with the extremities of said teeth in juxtaposed spaced relationship, means for rotating said cylinders in the same direction with the peripheral speed of said second cylinder substantially greater than that of said first cylinder, a pair of feed rolls presenting a multiplicity of teeth having rearwardly inclined rear faces, means for mounting said feed rolls for rotation with the extremities of said teeth presented thereby in juxtaposed spaced relation with respect to each other and with respect to the extremities of said teeth presented by said first cylinder, means for feeding fibers between said feed rolls, means for rotating said feed rolls in opposite directions for feeding fibers toward the teeth presented by said first cylinder, first cover means for said first cylinder extending from adjacent said feed rolls to immediately adjacent relation to the nip between said first and second cylinders with the inner surface thereof in proximate spaced relation to the extremities of the teeth presented by said first cylinder, means for removing fibers from said second cylinder, and cover means for said second cylinder having one margin immediately adjacent the nip between said first and second cylinders and the inner surface of which is in proximate spaced relation to the extremities of said teeth for confining fibers propelled by said teeth presented by said second cylinder in moving away from said nip between said first and second cylinders.

16. In a carding machine, the combination comprising a carding cylinder secured to a shaft, a bearing adjacent each end of said shaft for rotatably mounting said shaft, a cowl secured to each bearing adjacent each end of said cylinder, a pair of feed rolls for feeding fibers onto said carding cylinder, mounting means for said feed rolls carried by said cowls in secured relation thereto, and cover means for said cylinder carried by said cowls in secured relation thereto.

17. In a carding machine, the combination comprising a first cylinder, a second cylinder, means for mounting said cylinders for rotation about parallel axes with the peripheries of said cylinders in juxtaposed spaced relationship, a pair of feed rolls, means for mounting said feed rolls in fixed spaced relation with respect to the axis of said first cylinder with the peripheries thereof in juxtaposed spaced relation to the periphery of said first cylinder, and means for adjustably moving said first cylinder and said feed rolls relatively to said second cylinder while maintaining constant the fixed spacing between said feed rolls and the rotational axis of said first cylinder.

18. In a carding machine, the combination comprising a first cylinder presenting a multiplicity of teeth having substantially radial forward faces, a second cylinder presenting a multiplicity of teeth having substantially radial forward faces, means for mounting said cylinders for rotation about parallel axes with the extremities of said teeth in juxtaposed spaced relation, means for rotating said cylinders in the same direction with the peripheral speed of said second cylinder substantially greater than that of said first cylinder, fiber feeding means for feeding fibers onto said first cylinder, means for removing fibers from said second cylinder, cover means for said first cylinder having its inner surface in proximate spaced relation to the extremities of said teeth presented by said first cylinder for confining fiber during travel from adjacent said fiber feeding means to immediately adjacent relation to said nip, means for successively moving teeth presenting members into a zone of proximate operative spaced relation to said teeth presented in said second cylinder, cover means for said second cylinder extending from immediately adjacent said nip between said first and second cylinders to immediately adjacent said zone and extending from immediately adjacent said zone to immediately adjacent said removing means.

19. Apparatus according to claim 18 wherein said tooth presenting members are flats carried by an endless belt.

20. A carding machine comprising in combination first and second cylinders of the order of 10 to 20 inches in diameter, said cylinders presenting a multiplicity of teeth having radially disposed forward faces of the order of 0.1 inch in height, means for mounting said cylinders for rotation about substantially parallel axes with the clearance between the extremities of said teeth of the order of 0.005 inch, means for rotating said cylinders in the same direction with the peripheral speed of said second cylinder substantially greater than that of said first cylinder, fiber feeding means for feeding fibers onto said first cylinder, first cover means for said first cylinder having an inner arcuate surface which clears the extremities of said teeth presented by said first cylinder by not more than about 0.02 inch for confining fibers thereunder during travel from said fiber feeding means to the nip between said first and second cylinders, a third cylinder presenting a multiplicity of teeth having rearwardly inclined rear faces and mounted for rotation about an axis parallel to the axis of rotation of said second cylinder with the clearance between said teeth and the teeth presented by said second cylinder not more than about 0.005 inch, means for rotating said third cylinder in the opposite direction to that of said second cylinder and at a substantially lesser speed, second cover means for said second cylinder having an inner arcuate surface which clears the extremities of said teeth presented by said second cylinder by not more than 0.02 inch for confining fibers thereunder during travel of fibers from said nip between said first and second cylinders and the nip between said second and third cylinders, and third cover means for said third cylinder which clears the extremities of the teeth presented by said third cylinder by not more than about 0.03 inch for confining fibers thereunder in moving away from the nip between said second and third cylinders, said second cover means substantially surrounding said second cylinder between nips with said clearance of not more than about 0.02 inch, said first and second cover means meeting along a drag edge longitudinally disposed in immediate proximity to the nip between said first and second cylinders in the side of said nip approached by the periphery of said first cylinder, and there being a pocket disposed along and adjacent said drag edge and between it and the teeth presented by said second cylinder.

21. In a carding machine the combination comprising a rotatably mounted carding cylinder presenting a multiplicity of teeth, a stationary cover disposed so as to overlie the periphery of said carding cylinder with its inner surface in proximate spaced relation thereto for providing an arcuate space between the inner surface of said cover and the periphery of said carding cylinder, a stationary end closure at each end of said cylinder in juxtaposed spaced relation thereto for substantially completely closing off the ends of said arcuate space, a shaft to which said carding cylinder is secured, and bearing means for rotatably mounting said shaft, said end closures being secured in fixed relation to said bearing means, and said bearing means comprising a thrust bearing adjacent each end of said shaft relative to which said shaft is longitudinally adjustable, spring load imposing means cooperating with said thrust bearings for holding said shaft in constant longitudinal position relative to said thrust bearings, and means for adjusting the setting of said longitudinal position of said shaft relative to said thrust bearings.

22. A carding machine comprising in combination a first cylinder secured to a first shaft, a second cylinder secured to a second shaft, a third cylinder secured to a third shaft, first, second and third bearing means for rotatably mounting said first, second and third shafts in parallel relation with the peripheries of said first and second cylinders in proximate spaced relation and with the peripheries of said second and third cylinders in proximate spaced relation, first, second and third cowls secured to said first, second and third bearings, respectively, at the opposite ends of said first, second and third cylinders, respectively, first, second and third cover means for said first, second and third cylinders, respectively, secured to said first, second and third cowls, respectively, and feeding rolls mounted in secured relation to said cover means of said first cylinder for said first cylinder.

23. A carding machine comprising in combination spaced frame members, first and second cylinders, bearing means secured to said frame members for rotatably mounting said cylinders for rotation about parallel axes, means for rotating said cylinders in the same direction with the peripheral speed of said second cylinder substantially greater than that of said first cylinder, a multiplicity of teeth presented by the surfaces of said cylinders the forward faces of which are disposed substantially in alignment with prolongations of radii from the respective axes of rotation of said cylinders, said cylinders being disposed with said teeth presented thereby in juxtaposed spaced relation at the nip between said cylinders, fiber feeding means for depositing fibers on said first cylinder for travel therewith through a substantial travel distance to said nip, fiber removing means for removing attenuated fibers from the surface of said second cylinder at a location substantially spaced from said nip, first cover means for said first cylinder having inner arcuate surface in juxtaposed closely spaced relation to said teeth presented by said first cylinder and extending at least from adjacent said fiber feeding means to immediately adjacent said nip, second cover means for said second cylinder having inner arcuate surface in juxtaposed closely spaced relation to said teeth presented by said cylinder and extending at least from immediately adjacent said nip to immediately adjacent said fiber removing means, said first and second covers meeting on the side of said nip toward which the surface of said first cylinder travels at a drag edge immediately adjacent said nip over which fibers carried by said first cylinder have their direction of travel reversed upon transfer from said first cylinder to said second cylinder, and end closures at each end of each of said cylinders, the end closure for said first cylinder extending from immediately adjacent the peripheral surface of said first cylinder to the inner surface of the said first cover means and at least from adjacent said fiber feeding means to said nip thereby providing with said first cover means arcuate passage means substantially completely closed from adjacent said fiber feeding means to immediately adjacent said nip, and said end closure for said second cylinder extending from immediately adjacent the peripheral surface of said second cylinder to the inner surface of said first cover means and extending at least from said nip to said fiber removing means thereby providing with said second cover means arcuate passage means substantially completely closed from immediately adjacent said nip to immediately adjacent said fiber removing means.

24. A carding machine according to claim 23 wherein said cylinders are of the order of 10 to 20 inches in diameter, the forward faces of said teeth are of the order of 0.1 inch in height, the inner surface of said first and second covers is spaced from the extremities of said teeth by not more than substantially 0.03 inch, the clearance between the extremities of said teeth presented by said first and second cylinders is not greater than substantially 0.005 inch, and the clearance between said end closures and the peripheral surface of said cylinders is not greater than substantially 0.005 inch.

25. In a carding machine the combination comprising a carding cylinder, clothing for the surface thereof comprising a multiplicity of teeth, said teeth having substantially radially disposed forward faces essentially free of forward inclination from the radial, and cover means for said cylinder having a one end and an other end and having an inner arcuate surface between said ends spaced from the outer extremities of said teeth by a distance not greater than about one-third the height of the forward faces of said teeth whereby said teeth are effective to carry fibers with an air stream propelled by said forward faces of said teeth under confinement provided by said inner surface of said cover means during rotation of said cylinder in the direction of said forward faces of said teeth, means for rotating said cylinder in said direction, means adjacent said one end of said cover means for feeding fibers onto said cylinder for carriage with said air stream propelled by said teeth, fiber receiving means adjacent the other end of said cover means for receiving said fibers upon release from said confinement provided by said inner surface of said cover means, and confining cover means in juxtaposed spaced relation to the extremities of said teeth for confining an air stream and any fibers carried with said cylinder past said fiber receiving means for travel from said fiber receiving means to said fiber feeding means.

26. A carding machine according to claim 25 wherein the clearance between the extremities of said teeth and said inner surface of said cover means is less than 0.03 inch and wherein said fiber receiving means comprises a member presenting a continuous fiber receiving surface, and means for moving said surface at a rate which is substantially slower than the peripheral speed of said cylinder contiguously with respect to said cylinder immediately adjacent said other end of said cover means for reception of said fibers thereon in the form of a continuous web.

References Cited in the file of this patent

UNITED STATES PATENTS

| 147,779 | Mills | Feb. 24, 1874 |
| 410,864 | Taft | Sept. 10, 1889 |
| 485,680 | Canning | Nov. 8, 1892 |
| 620,089 | Threlfall | Feb. 21, 1899 |
| 1,567,541 | Oxley | Dec. 29, 1925 |
| 1,612,581 | Holden | Dec. 28, 1926 |
| 2,014,673 | Setzer | Sept. 17, 1935 |
| 2,396,571 | Gwaltney et al. | Mar. 12, 1946 |
| 2,731,676 | Apthrop et al. | Jan. 24, 1956 |
| 2,737,689 | Hunter | Mar. 13, 1956 |
| 2,879,549 | Miller et al. | Mar. 31, 1959 |

FOREIGN PATENTS

| 4,892 | Great Britain | of 1886 |
| 27,303 | Great Britain | of 1910 |
| 333,178 | Great Britain | Aug. 5, 1930 |
| 499,210 | Great Britain | Jan. 16, 1939 |

UNITED STATES PATENT OFFICE

CERTIFICATE OF CORRECTION

Patent No. 3,081,499                        March 19, 1963

Maurice A. Goldman

It is hereby certified that error appears in the above numbered patent requiring correction and that the said Letters Patent should read as corrected below.

Column 12, line 31, for "may" read -- many --; column 26, line 41, after "said", second occurrence, insert -- second --.

Signed and sealed this 5th day of November 1963.

(SEAL)
Attest:

ERNEST W. SWIDER
Attesting Officer

EDWIN L. REYNOLDS
Acting Commissioner of Patents